(12) United States Patent
Tomita et al.

(10) Patent No.: US 7,608,554 B2
(45) Date of Patent: *Oct. 27, 2009

(54) ZEOLITE FORMED PRODUCT, ZEOLITE LAMINATE INTERMEDIATE, ZEOLITE LAMINATE COMPOSITE AND METHOD FOR THEIR PREPARATION

(75) Inventors: Toshihiro Tomita, Nagoya (JP); Shinji Nakamura, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 43 days.

This patent is subject to a terminal disclaimer.

(21) Appl. No.: 11/521,008

(22) Filed: Sep. 14, 2006

(65) Prior Publication Data

US 2007/0014717 A1    Jan. 18, 2007

Related U.S. Application Data

(62) Division of application No. 09/980,260, filed as application No. PCT/JP01/01562 on Mar. 1, 2001, now abandoned.

(30) Foreign Application Priority Data

| Mar. 2, 2000 | (JP) | ............................. 2000-057453 |
| Feb. 16, 2001 | (JP) | ............................. 2001-040532 |
| Feb. 16, 2001 | (JP) | ............................. 2001-040598 |

(51) Int. Cl.
*B01J 29/06* (2006.01)
*C01B 39/04* (2006.01)

(52) U.S. Cl. .............................. 502/69; 502/60; 502/64; 502/4; 423/716; 423/DIG. 22; 423/707

(58) Field of Classification Search ...................... 502/4, 502/60, 64, 69; 423/716, DIG. 22, 705, 707
See application file for complete search history.

(56) References Cited

U.S. PATENT DOCUMENTS

| 4,387,258 | A | 6/1983 | Vadekar et al. |
| 5,413,975 | A | 5/1995 | Mueller et al. |
| 5,549,881 | A | 8/1996 | Vaughan et al. |
| 5,591,345 | A | 1/1997 | Engelen et al. |
| 5,772,980 | A | 6/1998 | Sul et al. |
| 5,824,617 | A * | 10/1998 | Lai ................................ 502/4 |
| 6,004,527 | A | 12/1999 | Murrell et al. |
| 6,037,292 | A | 3/2000 | Lai et al. |
| 6,063,723 | A | 5/2000 | Miller |
| 6,667,265 | B1 * | 12/2003 | Tomita et al. ................... 502/4 |
| 2002/0041845 | A1 | 4/2002 | Oku et al. |

FOREIGN PATENT DOCUMENTS

| EP | 0 152 485 A1 | 8/1985 |
| EP | 0 778 076 A1 | 6/1997 |
| GB | 2340112 A | 2/2000 |
| JP | 61-72621 A | 4/1986 |
| JP | 5-146684 A | 6/1993 |
| JP | 6-183727 A | 7/1994 |
| JP | 2000-327327 A | 11/2000 |
| WO | 00/23378 A1 | 4/2000 |

* cited by examiner

*Primary Examiner*—David M Brunsman
(74) *Attorney, Agent, or Firm*—Burr & Brown

(57) ABSTRACT

There are provided methods for producing a zeolite layered composite, methods for producing a zeolite shaped body and methods for producing a zeolite layered intermediate body. In one aspect, there is provided a method for producing a zeolite layered composite, comprising layering a template-containing zeolite membrane having a composition the same as or similar to that of a zeolite shaped body of a completely crystallized zeolite composed of tetrapropylammonium ion (TPA) and silica sol in a mixing ratio (TPA/$SiO_2$) of 0.015 to 0.08 by mole and containing a template therein on the zeolite shaped body, and simultaneously removing the template from the zeolite membrane and the zeolite shaped body by calcining the resulting layered product to obtain a zeolite layered composite comprising the zeolite shaped body and the zeolite membrane layered thereon.

10 Claims, 24 Drawing Sheets

10μm

10μm

10μm

10μm

10μm

10μm

10μm

10μm

100μm

100μm

MAXIMUM LENGTH     MAXIMUM LENGTH     MAXIMUM LENGTH

IN THE CASE OF SPHERICAL PARTICLE     IN THE CASE OF PLATE-LIKE PARTICLE     IN THE CASE OF IRREGULAR-SHAPE PARTICLE

100μm

100μm

10μm

10μm

100 μm

10 μm

100μm

100μm

10 μm

ZEOLITE FORMED PRODUCT, ZEOLITE LAMINATE INTERMEDIATE, ZEOLITE LAMINATE COMPOSITE AND METHOD FOR THEIR PREPARATION

CROSS REFERENCE TO RELATED APPLICATION

This application is a division of U.S. application Ser. No. 09/980,260 filed Nov. 1, 2001 now abandoned, which is a National Stage of PCT Application Serial No. PCT/JP01/01562, filed Mar. 1, 2001, and claims the benefit of Japanese Application 2000-057453, filed Mar. 2, 2000, Japanese Application 2001-040532, filed Feb. 16, 2001 and Japanese Application 2001-040598, filed Feb. 16, 2001, the entireties of which are incorporated herein by reference.

TECHNICAL FIELD

The present invention relates to a zeolite shaped body, a zeolite layered intermediate body, a zeolite-layered composite, and production methods for them. More particularly, the present invention relates to a zeolite shaped body capable of forming a zeolite membrane thereon without causing cracking, and satisfactorily reducing pressure loss and maintaining and improving mechanical strength when it is used as a gas separation membrane of a molecular sieve membrane and a pervaporation membrane and the like; a zeolite layered intermediate body comprising the zeolite shaped body and a zeolite membrane containing a template and layered thereon; a zeolite layered composite formed by calcining the zeolite layered intermediate body, and their efficient production methods.

BACKGROUND ART

Recently, a zeolite shaped body composed of particles of a zeolite has been employed widely for catalysts, catalyst carriers, adsorbents and the like. Also, a zeolite layered composite comprising a porous ceramic, a metal, or the like and a zeolite membrane layered thereon has been employed for a molecular sieve membrane (a gas separation membrane, a pervaporation membrane). Along with the proceeding of such situation, there proposed are zeolite-layered composites using a variety of porous substrates and their production methods.

For example, proposed are methods using glass, mullite, a cordierite type ceramic, alumina, silica, and the like as a substrate for a zeolite membrane and methods using a metal or another substrate coated with an inorganic substance (Japanese Patent Laid-Open No. 59-213615).

Also, proposed (JP-A-60-28826) are composites each comprising a porous supporting body of a metal, an inorganic or polymer substance and a thin membrane of a cage type zeolite integrated in one surface. Among them, those having high affinity for a gel substance are proposed as especially preferable ones for the supporting body to be used and practically, it is proposed to use No. 7930 product produced by Corning Glass Works, generally called Vycorl glass, as an especially preferable one.

Further, a method proposed (JP-A-1-148771) relates to a method for crystallization of zeolite on the surface of a monolithic ceramic supporting body as a substrate which may have an oxide composition containing 4 to 45% by weight of silica, 8 to 45% by weight of alumina, and 7 to 20% by weight of magnesia; and practically proposed is a sintered monolithic supporting body of cordierite, glass, or a glass ceramic.

Further, another method proposed (Japanese Patent Laid-Open No. 6-32610) relates to a method for production of an A-type or faujasite type zeolite membrane using a substrate of a substance mainly containing silicon oxide. The method aims to solve the problem of inferior adhesion strength of a zeolite membrane to a substrate, where in a zeolite membrane is used as a substrate itself and the substrate surface is made to be a zeolite membrane owing to its constitution, thereby the synthesis and the adhesion can simultaneously be carried out to simplify the processes. To be practical, a substrate made of borosilicate glass, quartz glass, silica-alumina, mullite or the like is proposed.

Further, there is another proposal (JP-A-9-173799) which relates to a production method of a carrier zeolite membrane, and a membrane as the carrier, including an inorganic, organic, or mixed substance selected from the group consisting of a ceramic substance basically containing alumina, zirconia, or titanium oxide; a metal; carbon; silica; a zeolite; a clay; and a polymer.

Further, proposed is a zeolite porous body which is a porous ceramic substrate subjected to conversion treatment to a zeolite and has a large number of inner holes with prescribed sizes and a compressive fracture strength of 5 MPa or higher (JP-A-11-292651).

As described above, a variety of zeolite layered composites each comprising a substrate and a zeolite membrane layered or formed thereon have been proposed, however these composites have the following problems.

That is, as shown in FIG. 16, the thermal expansion coefficient of a zeolite shows a rather complicated behavior; at a temperature to around 200° C., it is extremely low but it becomes a negative coefficient value at a temperature higher than that. Hence, if a zeolite membrane is to be used at a temperature exceeding 200° C., the thermal expansion coefficient difference becomes extremely high between a substrate, for example, an alumina-based substrate and the membrane, resulting in cracking of the zeolite membrane owing to the thermal stress.

Further, depending on the types of zeolite membranes, at the time of synthesis, a casing agent or a crystallization promoting agent is required to be added. In the case of a zeolite membrane containing a template, the template is removed by calcining at about 500° C. and as shown in the thermal expansion curve of a MFI type zeolite in FIG. 17, the thermal expansion behavior (the thermal expansion curve before the calcining in FIG. 17) of a zeolite membrane containing a template significantly differs from the thermal expansion behavior (the thermal expansion curve after the calcining in FIG. 17) of a zeolite membrane containing no template, so that the thermal expansion difference becomes extremely wide between a substrate of such as an alumina substrate and the zeolite membrane and cracking takes place in the zeolite membrane owing to the thermal stress at the time of the calcining.

To such problems, said proposal examples cannot be sufficient counter measures to deal with the problems.

Further, the following are proposed as examples of those having double layer structures of a substrate and a zeolite membrane: asymmetric membranes (JP-A-7-505333) each comprising a macroporous layer formed practically only from a molecular sieve crystal with a prescribed thickness and an upper layer for molecular separation having a prescribed thickness and a prescribed effective diameter of fine pores and formed practically only from the molecular sieve crystal of the same type as that of the material of the macroporous layer; a structure (JP-K-11-511685) composed of three layers, a carrier, an intermediate layer, and an upper layer and in which the intermediate layer and the upper layer contain prescribed crystalline molecular sieves; and a zeolite composite membrane (International Laid-open No. WO 00/23378) produced by forming a zeolite membrane containing a template on a zeolite shaped body containing a template and then calcining to form the membrane and simultaneously remove the template. These membranes and structure are respectively excellent in the properties; the capability of precisely adjusting the size of the fine pores and the capability of effectively preventing occurrence of cracking.

However, regarding the zeolite shaped body obtained as the zeolite composite membrane (International Laid-open No. WO 00/23378) formed simultaneously with removal of the template from said substrate, since the raw materials (a dried gel) are obtained by stirring and kneading preparation solutions of silica sol and tetrapropylammonium hydroxide (TPAOH), the obtained dried gel is easy to contain particles with different particle diameter and heterogenously dried state, so that dense and sparse parts and degranulated parts are easily formed in the zeolite particle portions in the micro-structure after the crystallization treatment and therefore it is not necessarily satisfactory one.

Further, regarding a method including processes of previously dispersing a template such as tetrapropylammonium (TPA) in a dried gel and then converting it to a zeolite by treatment with steam, since it has conventionally been thought necessary to stir a mixture solution of a gel and a template until they are dried as a dried gel production process, the following processes have generally been employed; heating mixture solution of the gel and the template to about 80° C. to evaporate water and successively continuously stirring (kneading) the solution until the mixture is sufficiently dried [N. Jappar, Q. Xia, and T. Tatsumi, J. Catal. 180, 132-141 (1998); R. Bandyopadhyay et al., Micropor. Mater. 32(1999) 81-91; Masahiko Matsukata, P. R. H. Prasad Rao, Korekazu Ueyama, Proceedings of the 11th Zeolite Research Meeting, Japan Association of Zeolite, in Matsuyama, 1995, A22; P. R. H. Prasad Rao, Proceedings of the 12th Zeolite Research Meeting, Japan Association of Zeolite, at Sophia University, 1996, A18.; P. R. Hari Prasad Rao & M. Matukata, Chem. Commun. (1996), p1441-1442, P. R. Hari Prasad Rao, K. Ueyama, M. Matsukata, Appl. Catal. A: General 166 (1998) 97-103; and the like].

However, such a method comprising the dried gel production process comprises complicated production process and is thus not suitable for mass production and further, the obtained dried gel is, as same as the case of said International Laid-open No. WO 00/23378, easy to be heterogenous in the size of the particle diameter and not homogeneous in the dried state and for that, in the micro-structure after the crystallization treatment, dense and sparse parts and degranulated parts are easily formed among the zeolite particle portions and the method is not necessarily satisfactory.

Further, in the case where the membranes or the structure (zeolite layered composites) are used as gas separation membranes of molecular sieve membranes and pervaporation membranes, it is required to improve the use efficiency by decreasing the pressure loss at the time of passing a gas or a liquid through the membranes and the substrate. If the dense parts of particles of the substrate, which are causes of increase of the pressure loss, are reduced or the particle size of the substrate is enlarged in order to reduce the pressure loss, the mechanical strength as a substrate for supporting a zeolite membrane is decreased (the reduction in the pressure loss in the substrate and the improvement of the mechanical strength are in an antinomic relation), so that it is extremely difficult to obtain those capable of satisfying both of the reduction in the pressure loss and the improvement of the mechanical strength and any membrane or structure capable of satisfying such properties has not been obtained so far.

The present invention is developed in consideration of said problems and aims to provide a zeolite shaped body by forming a zeolite membrane thereon without causing cracking, and capable of satisfactorily reducing pressure loss and improving mechanical strength when it is used as a gas separation membrane of a molecular sieve membrane, and a pervaporation membrane and the like; a zeolite layered intermediate body comprising the zeolite shaped body and a zeolite membrane containing a template and layered thereon; a zeolite layered composite formed by calcining the zeolite layered intermediate body, and their efficient production methods.

SUMMARY OF THE INVENTION

In order to achieve said purposes, according to the present invention, provided are a zeolite shaped body, a zeolite layered intermediate body, a zeolite layered composite, and production methods for them.

In one aspect of the invention, there is provided a porous zeolite shaped body made of a completely crystallized zeolite composed of tetrapropylammonium ion (TPA) and silica sol in a mole ratio (TPA/$SiO_2$) of 0.015 to 0.08.

In another aspect of the invention, there is provided a porous zeolite shaped body made of a zeolite still under crystallization and composed of tetrapropylammonium ion (TPA) and silica sol in a mole ratio (TPA/$SiO_2$) of 0.02 to 0.12.

In another aspect of the invention, there is provided a zeolite intermediate body, which includes one of the zeolite shaped bodies discussed above containing a template, and a template-containing zeolite membrane having a composition the same as or similar to that of the shaped body formed on the zeolite shaped body.

In another aspect of the invention, there is provided a zeolite layered composite comprising a zeolite shaped body and a zeolite membrane layered thereon produced by removing the template from the zeolite shaped body and the template-containing zeolite membrane by calcining the zeolite layered intermediate body.

In another aspect of the invention, there is provided a method for producing a zeolite layered composite comprising layering a template-containing zeolite membrane having a composition the same as or similar to that of a zeolite shaped body of a completely crystallized zeolite composed of tetrapropylammonium ion (TPA) and silica sol in a mole ratio (TPA/$SiO_2$) of 0.015 to 0.08 and containing a template therein on the zeolite shaped body; and simultaneously removing the template from the zeolite membrane and the zeolite shaped body by calcining the resulting layered product to obtain the zeolite layered composite including the zeolite shaped body with the zeolite membrane layered thereon.

In another aspect of the invention, there is provided a method for producing a zeolite layered composite comprising layering a template-containing zeolite membrane having a composition the same as or similar to that of a zeolite shaped body of a zeolite still under crystallization and composed of tetrapropylammonium ion (TPA) and silica sol in a mixing ratio (TPA/$SiO_2$) of 0.02 to 0.12 by mole and containing a template therein on the zeolite shaped body; and simultaneously removing the template from the zeolite membrane and the zeolite shaped body by calcining the resulting layered product to obtain the zeolite layered composite including the zeolite shaped body with the zeolite membrane layered thereon.

In another aspect of the invention, there is provided a porous zeolite shaped body which has an average particle diameter of 1.0 μm or larger, a bending strength of 1.5 MPa or higher, and a difference in pressure between a feed side and a permeation side of 1.0 atmospheric pressure or lower at 10 ml/cm$^2$·min of helium gas permeation flux when a thickness of the porous zeolite shaped body is adjusted to be 1.8 mm.

In another aspect of the invention, there is provided a zeolite layered intermediate body wherein the zeolite shaped body as described in the immediately preceding paragraph further comprises a template, and further comprising a template-containing zeolite membrane having a composition the same as or similar to that of the zeolite shaped body layered on the zeolite shaped body.

In another aspect of the invention, there is provided a zeolite layered composite comprising a zeolite shaped body and a zeolite membrane layered thereon, the zeolite layered composite being formed by removing the template from the zeolite shaped body and the template-containing zeolite membrane by calcining the zeolite layered intermediate body.

In another aspect of the invention, there is provided a method for producing a zeolite shaped body, comprising adding a tetrapropylammonium hydroxide (TPAOH) solution and tetrapropylammonium bromide (TPABr) to silica sol in such a manner that mixing ratios [TPAOH/(TPAOH+TPABr) and TPABr/(TPAOH+TPABr)] of tetrapropylammonium hydroxide (TPAOH) and tetrapropylammonium bromide (TPABr) to a total amount of tetrapropylammonium ion (TPA) become 0 to 99% by mole and 1 to 100% by mole, respectively to prepare a solution; drying the prepared solution by kneading the solution; shaping the obtained dried gel; and subjecting the shaped body to a crystallization treatment.

A method for producing a zeolite shaped body in accordance with another aspect of the present invention comprises adding a tetrapropylammonium hydroxide (TPAOH) solution to silica sol to prepare a solution, spraying the prepared solution to dry, shaping the obtained dried gel, and subjecting the shaped body to crystallization treatment.

A method for producing a zeolite layered intermediate body in accordance with another aspect of the present invention comprises adding a tetrapropylammonium hydroxide (TPAOH) solution and tetrapropylammonium bromide (TPABr) to silica sol in such a manner that mixing ratios [TPAOH/(TPAOH+TPABr) and TPABr/(TPAOH+TPABr)] of tetrapropylammonium hydroxide (TPAOH) and tetrapropylammonium bromide (TPABr) to a total amount of tetrapropylammonium ion (TPA) become 0 to 99% by mole and 1 to 100% by mole, respectively to prepare a solution, drying the prepared solution by kneading the solution, shaping the obtained dried gel, subjecting the shaped product to crystallization treatment to obtain a zeolite shaped body, immersing said zeolite shaped body in a solution having the same or similar composition as or to said prepared solution, and forming a template-containing zeolite membrane on said zeolite shaped body by hydrothermally synthesizing it thereon to produce a layered body comprising said zeolite shaped body and said template-containing zeolite membrane.

A method for producing a zeolite layered intermediate body in accordance with an other aspect of the present invention comprises adding a tetrapropylammonium hydroxide (TPAOH) solution to silica sol, spraying thus prepared solution to dry, shaping the obtained dried gel, subjecting the shaped product to crystallization treatment to obtain a zeolite shaped body, immersing said zeolite shaped body in a solution with the same or similar composition as or to that of said solution, and forming a template-containing zeolite membrane on the zeolite shaped body by hydrothermally synthesizing it thereon to produce a layered body comprising said zeolite shaped body and said template-containing zeolite membrane.

A method for producing a zeolite layered composite in accordance with another aspect of the present invention comprises adding a tetrapropylammonium hydroxide (TPAOH) solution and tetrapropylammonium bromide (TPABr) to silica sol in such a manner that the mole ratio of mixing ratios [TPAOH/(TPAOH+TPABr) and TPABr/(TPAOH+TPABr)] of tetrapropylammonium hydroxide (TPAOH) and tetrapropylammonium bromide (TPABr) to a total amount of tetrapropylammonium ion (TPA) become 0 to 99% and 1 to 100%, respectively to prepare a solution, drying the prepared solution by kneading the solution, shaping the obtained dried gel, subjecting the shaped body to crystallization treatment to obtain a zeolite shaped body, immersing said zeolite shaped body in a solution with the same or similar composition as or to that of said solution, forming a template-containing zeolite membrane on the zeolite shaped body by hydrothermally synthesizing it thereon to produce a layered body comprising said zeolite shaped body and said template-containing zeolite membrane, and then calcining the layered body to simultaneously removing the template.

A method for producing a zeolite layered composite in accordance with another aspect of the present invention comprises adding a tetrapropylammonium hydroxide (TPAOH) solution to silica sol to prepare a solution, spraying thus prepared solution to dry, shaping the obtained dried gel, subjecting the shaped product to crystallization treatment to obtain a zeolite shaped body, immersing said zeolite shaped body in a solution having the same or similar composition as or to that of said prepared solution, forming a template-containing zeolite membrane on the zeolite shaped body by hydrothermally synthesizing it thereon to produce a layered body comprising said zeolite shaped body and said template-containing zeolite membrane, and then calcining the layered body to simultaneously removing the template.

In a further aspect of the invention, there is provided a porous zeolite shaped body of a zeolite, wherein area of parts (sound parts) where respective particles are clearly observed by grain boundary fracture among particles composing the zeolite shaped body in microstructure observation of the fractured surface of the shaped body occupies 70% or more in the entire area of the fractured surface.

In a further aspect of the invention, there is provided a zeolite layered intermediate body, wherein the zeolite shaped body as described in the preceding paragraph contains a template, and a template-containing zeolite membrane having a composition the same as or similar to that of the shaped body is formed on the shaped body.

In a further aspect of the invention, there is provided a zeolite layered composite comprising a zeolite shaped body and a zeolite membrane formed thereon, wherein the zeolite layered composite is produced by removing said template from said zeolite shaped body and said template-containing zeolite membrane by calcining the zeolite layered intermediate body as described in the preceding paragraph.

A method for producing a zeolite shaped body in accordance with another aspect of the present invention comprises adding a tetrapropylammonium hydroxide (TPAOH) solution to silica sol in such a manner that a mixing ratio (TPA/SiO$_2$) of tetrapropylammonium ion (TPA) to the silica sol becomes 0.015 to 0.08 by mole to prepare a solution, drying the prepared solution by kneading the solution, wet pulverizing the obtained dried gel, drying the obtained slurry by spraying the slurry, shaping the obtained dried granular substance, and subjecting thus shaped body to crystallization treatment.

A method for producing a zeolite shaped body in accordance with another aspect of the present invention comprises adding a tetrapropylammonium hydroxide (TPAOH) solution to silica sol in such a manner that a mixing ratio (TPA/SiO$_2$) of tetrapropylammonium ion (TPA) to the silica sol becomes 0.015 to 0.08 by mole to prepare a solution, spraying thus prepared solution to dry, shaping the obtained dried gel, and subjecting thus shaped body to crystallization treatment.

A method for producing a zeolite layered intermediate body in accordance with another aspect of the present invention comprises adding a tetrapropylammonium hydroxide (TPAOH) solution to silica sol in such a manner that a mixing ratio (TPA/SiO$_2$) of tetrapropylammonium ion (TPA) to the silica sol becomes 0.015 to 0.08 by mole to prepare a solution, drying the prepared solution by kneading the solution, wet pulverizing the obtained dried gel, spraying the obtained slurry to dry, shaping the obtained dried granular substance, subjecting thus shaped product to crystallization treatment to obtain a zeolite shaped body, immersing said zeolite shaped body in a solution with the same or similar composition as or to said prepared solution, and forming a template-containing zeolite membrane on the zeolite shaped body by hydrothermally synthesizing it thereon to produce a layered body comprising the zeolite shaped body and the template-containing zeolite membrane.

A method for producing a zeolite layered intermediate body in accordance with another aspect of the present invention comprises adding a tetrapropylammonium hydroxide (TPAOH) solution to silica sol in such a manner that a mixing ratio (TPA/SiO$_2$) of tetrapropylammonium ion (TPA) to the silica sol becomes 0.015 to 0.08 by mole to prepare a solution, spraying thus prepared solution to dry, shaping the obtained dried gel, subjecting thus shaped product to crystallization treatment to obtain a zeolite shaped body, immersing said zeolite shaped body in a solution having the same or similar composition as or to that of said prepared solution, and forming a template-containing zeolite membrane on the zeolite shaped body by hydrothermally synthesizing it thereon to produce a layered body comprising the zeolite shaped body and the template-containing zeolite membrane.

A method for producing a zeolite layered composite in accordance with another aspect of the present invention comprises adding a tetrapropylammonium hydroxide (TPAOH) solution to silica sol in such manner that a mixing ratio (TPA/SiO$_2$) of tetrapropylammonium ion (TPA) to the silica sol becomes 0.015 to 0.08 by mole to prepare a solution, drying the prepared solution by kneading the solution, wet pulverizing the obtained dried gel, drying the obtained slurry by spraying the slurry, shaping the obtained dried granular substance, subjecting thus shaped product to crystallization treatment to obtain a zeolite shaped body, immersing said zeolite shaped body in a solution having the same or similar composition as or to that of said prepared solution, and forming a template-containing zeolite membrane on the zeolite shaped body by hydrothermally synthesizing it thereon to produce a layered body comprising the zeolite shaped body and the template-containing zeolite membrane, and then simultaneously removing the template by calcining the layered body.

A method for producing a zeolite layered composite in accordance with another aspect of the present invention comprises adding a tetrapropylammonium hydroxide (TPAOH) solution to silica sol in such manner that a mixing ratio (TPA/SiO$_2$) of tetrapropylammonium ion (TPA) to the silica sol becomes 0.015 to 0.08 by mole to prepare a solution, spraying thus prepared solution to dry, shaping the obtained dried gel, subjecting thus shaped product to crystallization treatment to obtain a zeolite shaped body, immersing said zeolite shaped body in a solution with the same or similar composition as or to that of said solution, forming a template-containing zeolite membrane on the zeolite shaped body by hydrothermally synthesizing it thereon to produce a layered body comprising the zeolite shaped body and the template-containing zeolite membrane, and then simultaneously removing the template by calcining the layered body.

DETAILED DESCRIPTION OF THE INVENTION

Since a zeolite shaped body of the invention is to be effectively used as a substrate in form of a zeolite layered composite by layering or forming a zeolite membrane thereon for a gas separation membrane of a molecular sieve membrane and a pervaporation membrane, it is required to prevent cracking in the zeolite to be layered or formed thereon. For that, a zeolite shaped body of the invention is preferably a porous zeolite composed of particles of a zeolite with the composition which is the same as or similar to that of the zeolite membrane to be layered thereon in the case where it is used for obtaining a zeolite layered composite by layering the zeolite membrane thereon.

Figure 17:
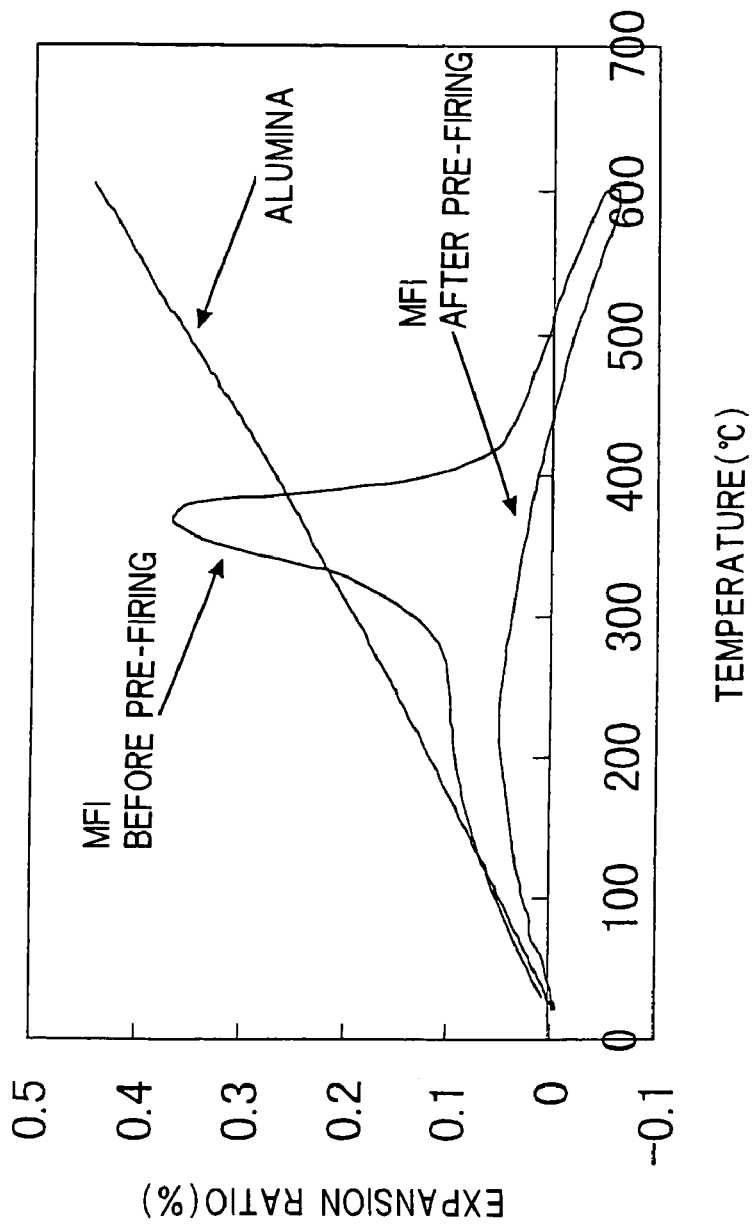
FIG. 17 is a graph showing the thermal expansion curves of a MFI type zeolite (before calcining and after calcining) and that of alumina.

Especially, in the case where a zeolite layered composite is formed using a template, in consideration of the fact that the thermal expansion behavior of a template-containing zeolite membrane is extremely different from that of a zeolite membrane containing no template as shown in FIG. 17, only using a substrate (for example, quartz glass and the like) with the thermal expansion coefficient approximate to that of the zeolite membrane is insufficient to solve the thermal expansion difference at the time of calcining at about 500° C. for removal of the template and consequently cracking takes place in the zeolite membrane, and therefore, a zeolite shaped body of the invention is preferably a porous zeolite with the composition which is the same as or similar to that of the zeolite membrane in the entire respect with the composition including the template.

A zeolite shaped body of the invention is a porous zeolite shaped body of a zeolite, characterized by being made of a completely crystallized zeolite and composed of tetrapropylammonium ion (TPA) and silica sol in the mixing ratio (TPA/SiO$_2$) of 0.015 to 0.08 by mole or a porous zeolite shaped body of a zeolite characterized by being made of a zeolite still under crystallization and composed of tetrapropylammonium ion (TPA) and silica sol in the mixing ratio (TPA/SiO$_2$) of 0.02 to 0.12 by mole (hereinafter, this invention is sometimes referred as to "the first invention").

Consequently, since a zeolite shaped body of the first invention is provided with the strength increased to 1.5 MPa or higher, a zeolite membrane can be formed thereon even under hydrothermal environments without being damaged and in addition to that, even after the zeolite membrane is formed, the resulting shaped body can retain the function of the membrane without damaging the zeolite membrane.

Incidentally, regarding the crystalline phase of a zeolite, the term, "a completely crystallized zeolite", means those having all of the sharp peaks, which show a zeolite, clearly observed in x-ray diffraction in a range of 20 to 30° (CuKα) and having no halo and the term, "a zeolite still under the crystallization", means those having peaks of a zeolite even though a few and in this case, the zeolite has compounded diffraction patterns in which halo showing amorphous, which will be described later, and sharp peaks showing a zeolite are overlaid in terms of x-ray diffraction. Incidentally, those other than the above exemplified ones having only broad halo but no clear peak observed means "an amorphous zeolite".

Further, a zeolite layered intermediate body of the first invention is characterized in that said zeolite shaped body contains a template and a template-containing zeolite membrane with a composition the same as or similar to that the zeolite membrane is layered on the shaped body.

Further, a zeolite layered composite of the first invention is characterized by comprising a zeolite membrane formed on a zeolite shaped body and being produced by removing the template from the zeolite shaped body and the template-containing zeolite membrane by calcining said zeolite layered intermediate body.

Although a zeolite to be used for the first invention is not particularly restricted, effectively usable in the first invention are, for example, MFI, AFI, DDR and the like (reference to Park S. H. et al. Stud. Surf. Sci. Catal. 1997, 105, 1989-1994), whose thermal expansion shows unique nonlinear behavior, since it is generally difficult to prevent occurrence of cracking in a zeolite membrane in the case where a zeolite layered composite is produced from a zeolite membrane using these zeolites and a zeolite shaped body as a substrate.

Further, in the case where a template is required at the time of zeolite membrane formation, usable as the template are a hydroxide[tetrapropylammonium hydroxide (TPAOH)] or bromide[tetrapropylammonium bromide (TPABr)] of tetrapropyl-ammonium to be added to a MFI type zeolite membrane, a hydroxide or bromide of tetraethylammonium (TEA) to be added to a BEA type zeolite, and a zeolite membrane containing such a template and a zeolite membrane containing no template are significantly different from each other, as shown in FIG. 17, in the thermal expansion behavior.

Consequently, as a zeolite shaped body of the first invention, preferable to be used are, in the case where MFI, AFI, DDR, or the like and containing a template is used and a zeolite membrane is layered or formed thereon to be employed for a zeolite layered composite, zeolites having the same or similar compositions even including addition of a template same as that of the zeolite membrane, and preferable to be used are, in the case where MFI, AFI, DDR, or the like and containing no template is used and a zeolite membrane is layered or formed there on to be employed for a zeolite layered composite, zeolites having the same or similar compositions even including addition of no template.

Further, the production method of a zeolite layered composite of the first invention comprises a process of layering a template-containing zeolite membrane with a composition the same as or similar to that of a template-containing zeolite shaped body of a completely crystallized zeolite composed of tetrapropylammonium ion (TPA) and silica sol in the mixing ratio (TPA/SiO$_2$) of 0.015 to 0.08 by mole or that of a template-containing zeolite shaped body of a zeolite still under crystallization and composed of tetrapropylammonium ion (TPA) and silica sol in the mixture ratio (TPA/SiO$_2$) of 0.02 to 0.12 by mole on either one of the described zeolite shaped bodies and simultaneously removing the template from said zeolite membrane and said zeolite shaped body by calcining the resulting layered product.

As a method for layering a zeolite membrane on a zeolite shaped body, a conventionally known method can be employed and, for example, a hydrothermal synthesis method, a vapor phase transport method may be employed.

Further, as a method for producing the zeolite shaped body, the following methods are known and any one may be employed:
(1) a method of hardening a zeolite powder with a binder;
(2) a method of converting a binder into a zeolite by chemical treatment after a zeolite powder is hardened with the binder; and
(3) a method of shaping a zeolite precursor and converting it to a zeolite by heat treatment.

Regarding said binder addition method (1), examples are a method of adding a sol such as silica sol to a zeolite (See JP-A-2-4445), a method of adding attapulgite type clay and carboxymethyl cellulose to a zeolite (See JP-A-10-81511), and the like.

Regarding the binder-less method (2), examples are a method of mixing kaolin with a zeolite, firing the mixture, and then converting kaolin to a zeolite by alkaline hydrothermal treatment (See JP-A-10-101326), a method of mixing a zeolite with metakaolin and then converting metakaolin to a zeolite by alkaline treatment (See JP-A-52-103391), and the like.

Further, regarding the zeolite solid-phase synthesis method (3), examples are a method for obtaining a zeolite of such as MFI and the like by mixing a template to kanemite to obtain an amorphous silicate powder and heat treatment it after shaping it (See JP-B-2725720), a method for obtaining a zeolite by mixing a template to TEOS, hydrolyzing the mixture, shaping the mixture, and then heat treatment it (reference Simizu, S., Kiyozumi Y. & Mizukami F. Chem. Lett. 1996, 403-404) and the like.

A zeolite shaped body of the invention is a porous zeolite shaped body of a zeolite, characterized by having an average particle diameter of 1.0 μm or larger, a bending strength of 1.5 MPa or higher, and a difference in pressure between a feed side and a permeation side of 1.0 atmospheric pressure or lower at 10 ml/cm$^2$·min of helium gas permeation flux when a thickness of the porous zeolite shaped body is adjusted to be 1.8 mm (hereinafter, the invention is also referred as to "the second invention").

As a template if necessary to be used at the time of forming a zeolite to be employed for the second invention and a zeolite membrane, usable are those same as the first invention.

A zeolite shaped body of the second invention has an average particle diameter of 1.0 μm or larger, preferably 2.5 μm or larger,; a bending strength of 1.5 MPa or higher, preferably 6.0 MPa or higher, and a difference in pressure between a feed side and a permeation side of 1.0 atmospheric pressure or lower, preferably 0.6 atmospheric pressure or lower, at 10 ml/cm$^2$·min of helium gas permeation feed when its thickness is adjusted to be 1.8 mm.

By satisfying these conditions, a zeolite shaped body of the second invention enables to form a zeolite membrane thereon without causing cracking, and capable of satisfactorily reducing pressure loss and improving mechanical strength when it is used as a gas separation membrane of a molecular sieve membrane and a pervaporation membrane and the like.

Figure 18:
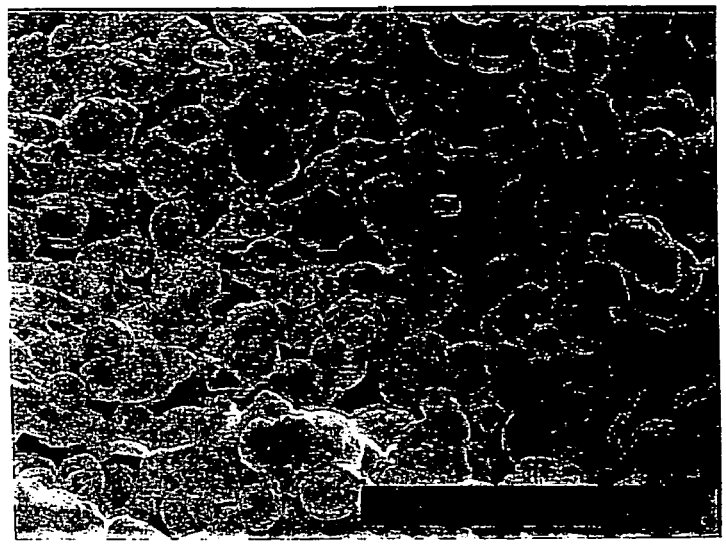
FIG. 18 shows a SEM photograph showing the method for measuring the average particle diameter.
Figure 19:
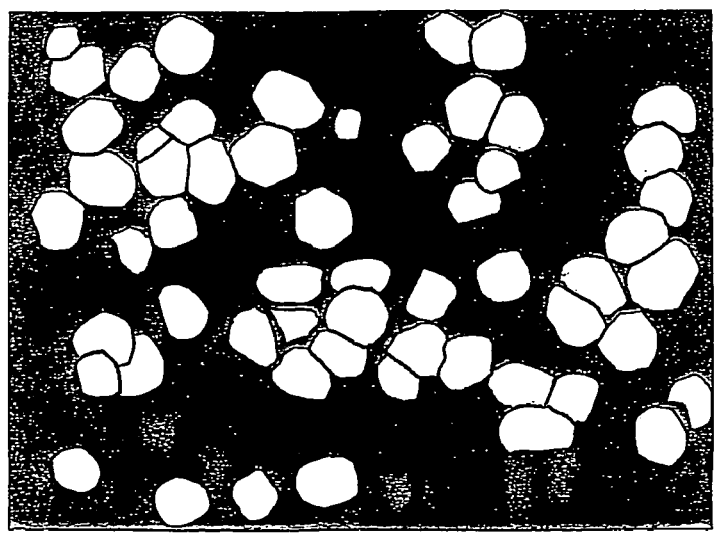
FIG. 19 is a replicated figure of the SEM photograph showing the method for measuring the average particle diameter.
Figures 20A, 20B, 20C:
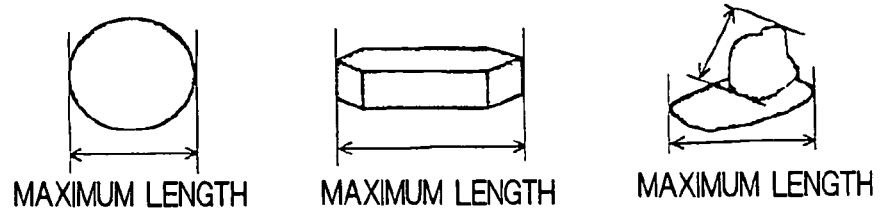
FIG. 20 is a schematic figure illustrating the method for measuring the average particle diameter.

Incidentally, the average particle diameter is calculated by measuring the maximum length of each particle and averaging the measurement result using an image analyzer. That is, the fractured surface of a zeolite shaped body of the second invention (parts extracted at random) is observed by a scanning electron microscope (SEM) and photographed to obtain SEM photographs (FIG. 18). Based on the SEM photograph, a replicated figure divided into white and black parts is produced (FIG. 19). In this case, the white parts show the particles and the black parts show the voids and unclear parts among particles, and particles whose entire portion are seen are selected and if the entire portion is not seen, particles of which at least the maximum particle diameter can be observed are selected. Further, the particles which are overlapped and whose entire portion are unclear are omitted for the measurement. For the image analysis, as an apparatus, an image analyzer (trade name: Image Analyzer V10, manufactured by Toyobo Co., Ltd.) is used to input the replicated image into a personal computer and the measurement region, the scale and the binary treatment are set (the treatment for identifying the white parts of the replicated figure as zeolite particles and the black parts as non-measured parts of such as voids among particles) to measure the maximum length of the respective particles according to the standards shown in FIGS. 20(a) to (c) and calculate the average particle diameter.

The bending strength is measured according to JIS R 1601.

Figure 21:
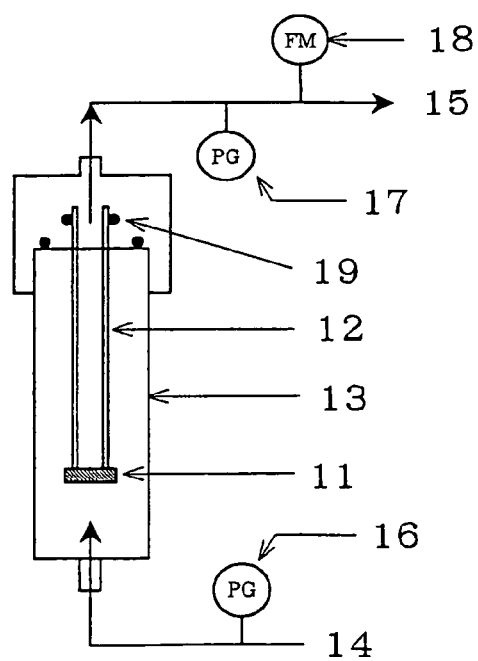
FIG. 21 is a schematic figure illustrating the method for measuring the pressure loss.

Further, the pressure loss is measured by a method shown in FIG. 21.

That is, a zeolite shaped body 11 (18 mm of diameter, 1.8 mm of thickness) of the second invention and a quartz glass tube 12 are joined with epoxy resin and disposed in a container 13 made of a metal (a stainless steel). At room temperature, helium gas is used as a feed gas 14 and the pressure is increased to at highest 8 kgf/cm$^2$, and the pressure of the feed gas 14 is measured by a pressure gauge 16, the pressure of the permeating gas 15 is measured by a pressure gauge 17, and the permeation flux is measured by a flow meter 18. The difference in pressure between the feed side and the permeation side at 10 ml/cm$^2$·min of helium gas permeation flux is defined as the pressure loss.

Incidentally, since the pressure loss of a porous material is increased in proportion to the thickness of a measurement specimen (the pressure loss increases two times high, if the thickness increases two times thick), the thickness of a measurement specimen is required to be always constant or correction by calculation is required in consideration of the thickness. In the second invention, the thickness of a specimen is made even to be 1.8 mm and with such a shape, the pressure difference between the feed side and the permeation side is measured and the value is defined as the pressure loss.

The zeolite shaped body production method of the second invention comprises processes of adding a tetrapropylammonium hydroxide (TPAOH) solution and tetrapropylammonium bromide (TPABr) to silica sol in such a manner that the mole ratio of mixing ratios [TPAOH/(TPAOH+TPABr) and TPABr/(TPAOH+TPABr)] of tetrapropylammonium hydroxide (TPAOH) and tetrapropylammonium bromide (TPABr) to the total amount of tetrapropylammonium ion (TPA) become 0 to 99% and 1 to 100%, respectively, drying the produced solution by kneading, shaping the obtained dried gel, and subjecting the shaped body to crystallization treatment.

In this case, the mixing ratio (TPA/SiO$_2$ mole ratio) of the tetrapropylammonium ion (TPA) and silica sol may be adjustable in any range within a range of 0.015 to 0.08 by mole since the average particle diameter of the zeolite shaped body is not changed and the bending strength is 1.5 MPa or higher, which is required for a substrate to be used for production of a zeolite layered composite, (the strength high enough to avoid the damage of a zeolite membrane in hydrothermal synthesis environments and the damage even after membrane formation). In the embodiments of the second invention, TPA/SiO$_2$ is adjusted to be 0.04 by mole ratio at which the bending strength becomes the maximum.

If the mole ratio of TPA/SiO$_2$ and the respective ratios of TPAOH and TPABr to the total amount of TPA of a produced solution are kept in prescribed values, respectively, an alkaline source such as sodium hydroxide, potassium hydroxide, and the like may be added to adjust pH, if necessary.

Then, in order to dry the produced solution, the produced solution is added to a Teflon beaker and stirred by a magnetic stirrer and then, while being heated in a thermostat at a prescribed temperature, the solution is continuously manually stirred with a Teflon rod and kneaded to evaporate water and obtain a dried gel. The stirring and kneading in this case maybe carried out using a heating kneader or the like.

Then, the dried gel is shaped by properly forming the gel in a prescribed shape by a uniaxial pressing with a die (the total pressure 1,000 kgf) and then carrying out cold isostatic pressing to obtain a dried gel shaped body. At this time, the pressure of the cold isostatic pressing is preferable to be adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

The zeolite shaped body production method of the second invention may comprise processes of adding a tetrapropylammonium hydroxide (TPAOH) solution to silica sol in such a manner that the mole ratio of mixing ratio (TPA/SiO$_2$) of tetrapropylammonium ion (TPA) to the silica sol becomes a prescribed value, spraying thus prepared solution to dry, shaping the obtained dried gel, and subjecting thus obtained gel to crystallization treatment to obtain a product.

As the method for spraying thus prepared solution to dry, usable is, for example, a spraying and drying apparatus for a solution and a slurry such as a spray drier, a fluid bed granulation dryer and the like. To dry the produced solution in the second invention, a spray drier is used. The produced solution is transported to a spraying nozzle tip by a liquid sending pump, and the solution is sprayed from a nozzle tip by pressurized air, dried in a drying chamber where dry air is circulated, and recovered. At this time, the air circulated in the drying chamber is previously heated to 180° C. in the periphery of the spraying port of the produced solution and the pressurized air, however the temperature may be changed depending on the volume of the drying chamber and it is therefore not particularly restricted.

In this case, the mixing ratio (TPA/SiO$_2$ mole ratio) of the tetrapropylammonium ion (TPA) and silica sol may be adjustable in any range within a range of 0.015 to 0.08 by mole since the average particle diameter of the zeolite shaped body is not changed and the bending strength is 1.5 MPa or higher, which is required for a substrate to be used for production of a zeolite layered composite. In the examples of the second invention, the mole ratio of TPA/SiO$_2$ is adjusted to be 0.04 at which the bending strength becomes the maximum.

If the mole ratio of TPA/SiO$_2$ is kept in prescribed values, an alkaline source such as sodium hydroxide, potassium hydroxide, and the like may be added to adjust pH based, if necessary.

Then, the produced solution is sprayed and dried by said spraying method to obtain a dried gel.

Then, the dried gel is shaped by properly forming the gel in a prescribed shape by a uniaxial pressing with a die (the total pressure 1,000 kgf) and then carrying out cold isostatic pressing to obtain a dried gel shaped body. At this time, the pressure of the cold isostatic pressing is preferable to be adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

The method for drying by spraying in such a manner can carry out drying more and prevent the microstructure after the crystallization treatment more efficiently from being coarsened and degranulated than said method for drying by kneading.

A zeolite layered intermediate body of the second invention is characterized by comprising said zeolite shaped body containing a template and a template-containing zeolite membrane with the composition same as or similar to that of the shaped body layered on the shaped body.

As a formation method of the template-containing zeolite membrane, the same method as that in the first invention may be employed.

Further, a zeolite layered composite of the second invention is characterized by comprising a zeolite shaped body with a zeolite membrane layered on the shaped body and being produced by removing the template from the zeolite shaped body and the zeolite-containing zeolite membrane by calcining said zeolite layered intermediate body.

In this case, since a zeolite layered composite is to be employed for a gas separation membrane of a molecular sieve membrane and a pervaparation membrane, a template-containing zeolite membrane or a zeolite membrane, from which the template is removed, to be layered on a zeolite shaped body is required to have sufficient thickness so as to prevent exposure of the zeolite shaped body and to be a dense membrane. Further, in the case where those containing a template are used as a zeolite shaped body, a template-containing zeolite membrane to be layered thereon is required to be made of a zeolite with the composition same as or similar to that of the zeolite shaped body, including that the membrane contains the same template (that is same in the case of the first invention and also in the case of the third invention which will be described later.).

A zeolite layered intermediate body production method of the second invention is characterized by comprising the processes of adding a tetrapropylammonium hydroxide (TPAOH) solution and tetrapropylammonium bromide (TPABr) to silica sol in such a manner that the mole ratio of mixing ratio (TPA/SiO$_2$) of tetrapropylammonium ion (TPA) of them and the silica sol becomes a prescribed value, and the respective mixing ratios [TPAOH/(TPAOH+TPABr) and TPABr/(TPAOH+TPABr)] of tetrapropylammonium hydroxide (TPAOH) and tetrapropylammonium bromide (TPABr) to the total amount of tetrapropylammonium ion (TPA) become 0 to 99% and 1 to 100%, respectively, drying the produced solution by kneading the solution, shaping the obtained dried gel, subjecting the shaped product to crystallization treatment to obtain a zeolite shaped body, immersing the obtained zeolite shaped body in a solution with the same or similar composition as or to that of the solution, and forming a template-containing zeolite membrane on the zeolite shaped body by hydrothermally synthesizing it thereon to produce a layered body comprising the zeolite shaped body and the template-containing zeolite membrane. More exemplified explanation will be given in the description of a zeolite layered composite production method of the second invention.

Further, the method may be a one, characterized by comprising the processes of adding a tetrapropylammonium hydroxide (TPAOH) solution to silica sol in such a manner that the mixing ratio (TPA/SiO$_2$) of tetrapropylammonium ion (TPA) to the silica sol becomes=a prescribed value, spraying thus prepared solution to dry, shaping the dried gel, subjecting the shaped product to crystallization treatment to obtain a zeolite shaped body, immersing the obtained zeolite shaped body in a solution with the same or similar composition as or to that of the prepared solution, and forming a template-containing zeolite membrane on the zeolite shaped body by hydrothermally synthesizing it thereon to produce a layered body comprising the zeolite shaped body and the template-containing zeolite membrane. More exemplified explanation will be given in the description of a zeolite layered composite production method of the second invention.

A zeolite layered composite production method of the second invention is characterized by comprising the processes of adding a tetrapropylammonium hydroxide (TPAOH) solution and tetrapropylammonium bromide (TPABr) to silica sol in such a manner that the mixing ratio (TPA/SiO$_2$) of tetrapropylammonium ion (TPA) of them to the silica sol becomes a prescribed value and the respective mixing ratios [TPAOH/(TPAOH+TPABr) and TPABr/(TPAOH+TPABr)] of tetrapropylammonium hydroxide (TPAOH) and tetrapropylammonium bromide (TPABr) to the total amount of tetrapropylammonium ion (TPA) become 0 to 99% by mole and 1 to 100% by mole, respectively, drying thus prepared solution by kneading the solution, shaping the obtained dried gel, subjecting the shaped product to crystallization treatment to obtain a zeolite shaped body, immersing the obtained zeolite shaped body in a solution with the same or similar composition as or to that of the prepared solution, forming a template-containing zeolite membrane on the zeolite shaped body by hydrothermally synthesizing it thereon to produce a layered body comprising the zeolite shaped body and the template-containing zeolite membrane, and then simultaneously removing the template from the layered body by calcining.

In this case, the mixing ratio (TPA/SiO$_2$ mole ratio) of the tetrapropylammonium ion (TPA) and silica sol may be adjustable in any range within a range of 0.015 to 0.08 by mole since the average particle diameter of the zeolite shaped body is not changed and the bending strength is 1.5 MPa or higher, which is required for a substrate to be used for production of a zeolite layered composite. In the embodiments of the second invention, the mole ratio of TPA/SiO$_2$ is adjusted to be 0.04 at which the bending strength becomes the maximum.

If the mole ratio of TPA/SiO$_2$ and the respective ratios of TPAOH and TPABr to the total amount of TPA of a produced solution are kept in prescribed values, respectively, an alkaline source such as sodium hydroxide, potassium hydroxide, and the like may be added to adjust pH, if necessary.

Then, in order to dry the produced solution, the produced solution is added in a Teflon beaker and stirred by a Teflon rod and then, while being heated in a thermostat at a prescribed temperature, the solution is continuously manually stirred and kneaded to evaporate water and obtain a dried gel. The stirring and kneading in this case may be carried out using a heating kneader or the like.

Then, the dried gel is shaped by properly forming the gel in a prescribed shape by a uniaxial pressing with a die (the total pressure 1,000 kgf) and then carrying out cold isostatic pressing to obtain a dried gel shaped body. At this time, the pressure of the cold isostatic pressing is preferably adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used, and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

A template-containing zeolite is layered on the zeolite shaped body obtained in the manner as described above by adding a TPAOH solution, TPABr, and distilled water to silica sol in such a amount that the mole ratio of SiO$_2$/TPAOH/TPABr/water becomes a prescribed value to prepare a mixed solution, charging thus obtained solution to a pressure vessel, immersing the zeolite shaped body in the produced solution, causing reaction for 1 hour or longer in an oven at 100° C. or higher to form a sufficiently thick and dense layer of a template-containing zeolite membrane on the zeolite shaped body and to obtain a zeolite layered intermediate body, calcining the zeolite layered intermediate body to obtain a zeolite layered composite. In the examples of the second invention, reaction is carried out for 18 hours in an oven at 180° C. to form a dense layer of a zeolite membrane with the thickness of 20 μm or thicker on the zeolite shaped body.

Incidentally, if the mole ratio of SiO$_2$/tetrapropylammonium ion (TPA)/water is kept in prescribed value, an alkaline source such as sodium hydroxide, potassium hydroxide, and the like may be added to adjust pH, if necessary.

Further, as the method for zeolite membrane formation, the same method as that of the first invention may be employed.

The zeolite layered composite production method of the second invention may comprise processes of adding a tetrapropylammonium hydroxide (TPAOH) solution to silica sol in such a manner that the mole ratio of mixing ratio (TPA/SiO$_2$) of tetrapropylammonium ion (TPA) to the silica sol become a prescribed value, spraying thus prepared solution to dry, shaping the obtained dried gel, and subjecting thus shaped product to crystallization treatment to obtain a zeolite shaped body, immersing the obtained zeolite shaped body in a solution with the same or similar composition as or to that of the solution, forming a template-containing zeolite membrane on the zeolite shaped body by hydrothermally synthesizing it thereon to produce a layered body comprising the zeolite shaped body and the template-containing zeolite membrane, and simultaneously removing the template by calcining the obtained layered body.

Incidentally, in the zeolite shaped body production, the mixing ratio (TPA/SiO$_2$ mole ratio) of the tetrapropylammonium ion (TPA) and silica sol maybe adjustable in any range within a range of 0.015 to 0.08 by mole since the average particle diameter of the zeolite shaped body is not changed and the bending strength is 1.5 MPa or higher, which is required for a substrate to be used for production of a zeolite layered composite. In the examples of the second invention, TPA/SiO$_2$ mole ratio is adjusted to be 0.04 at which the bending strength becomes the maximum.

Then, for drying the produced solution, a spray dryer is used. The produced solution is sprayed by pressurized air and dried in a drying chamber where dry air is circulated. At this time, the air circulated in the drying chamber is previously heated to 180° C. in the periphery of the spraying port, however the temperature may be changed depending on the volume of the drying chamber and it is therefore not particularly restricted.

Then, the dried gel is shaped by properly forming the gel in a prescribed shape by a uniaxial pressing with a die (the total pressure 1,000 kgf) and then carrying out cold isostatic pressing to obtain a dried gel shaped body. At this time, the pressure of the cold isostatic pressing is preferable to be adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

A template-containing zeolite is layered on thus obtained zeolite shaped body by adding a TPAOH solution, TPABr, and distilled water to silica sol in such a manner that the mole ratio of SiO$_2$/TPAOH/TPABr/water becomes a prescribed value, adjusting the mixed solution, loading the obtained solution to a pressure vessel, immersing the zeolite shaped body in the produced solution, causing reaction for 1 hour or longer in an oven at 100° C. or higher to form a sufficiently thick and dense layer of a template-containing zeolite membrane on the zeolite shaped body and to obtain a zeolite layered intermediate body, calcining the zeolite layered intermediate body to obtain a zeolite layered composite and then calcining the zeolite layered intermediate body to obtain a zeolite layered composite. In the examples of the second invention, reaction is carried out for 18 hours in an oven at 180° C. to form a dense layer of a zeolite membrane with the thickness of 20 μm or thicker on the zeolite shaped body.

Incidentally, if the mole ratio of SiO$_2$/tetrapropylammonium ion (TPA)/water is kept in prescribed value, an alkaline source such as sodium hydroxide, potassium hydroxide, and the like may be added to adjust pH, if necessary.

Further, as the method for zeolite membrane formation, the same method as that of the first invention may be employed.

A zeolite shaped body of the invention is a porous zeolite shaped body composed of particles of a zeolite and is characterized in that the area of the parts (the entirely sound parts) where respective particles are clearly observed by grain boundary fracture among particles composing said zeolite shaped body in microstructure observation of the fractured surface of the shaped body occupies 70% or more in the entire area of the fractured surface (hereinafter, the invention is sometimes referred as to the third invention.).

If a template is required at the time of zeolite or zeolite membrane formation to be employed for the third invention, as the template, those same as used for the first and the second inventions may be employed.

A zeolite shaped body of the third invention is characterized in that the area of the parts (the entirely sound parts) where respective particles are clearly observed by grain boundary fracture among particles composing said zeolite shaped body in microstructure observation of the fractured surface of the shaped body occupies 70% or more in the entire area of the fractured surface.

As described above, since a zeolite shaped body of the third invention has the area of the entirely sound parts in microstructure of the fractured surface of 70% or more in the entire area of the fractured surface, degranulation and formation of coarse parts scarcely take place to give homogeneous microstructure in the fractured surface, and capable of satisfactorily reducing pressure loss and improving mechanical strength.

Incidentally, in the third invention, the homogeneity in the microstructure of said fractured surface is calculated by observing the microstructure of the fractured surface of a zeolite shaped body by a scanning electron microscope (SEM) and calculating the ratio of the area of the entirely sound parts to the entire area of the fractured surface using an image analyzer.

Figure 33:
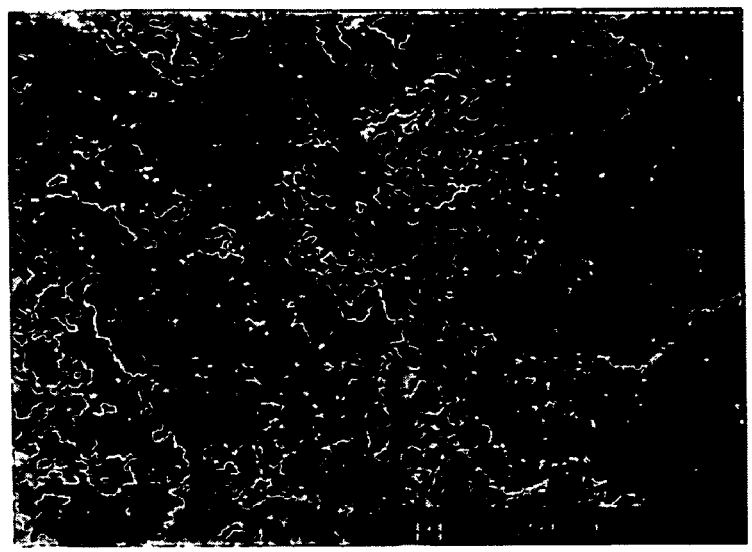
FIG. 33 is a SEM photograph illustrating the method for measuring the homogeneity in the fractured surface of a zeolite shaped body obtained.
Figure 33:
Figure 34:
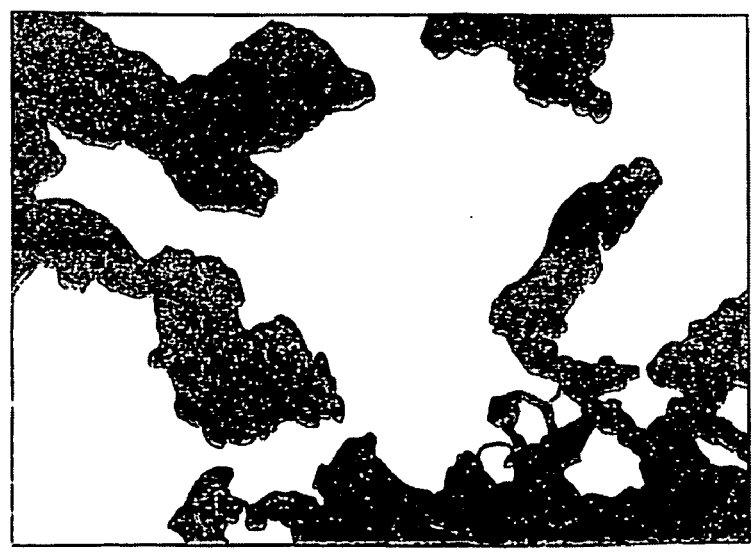
FIG. 34 is a replicated figure of a SEM photographs illustrating the method for measuring the homogeneity in the fractured surface of a zeolite shaped body obtained.
Figure 34:

That is, the fractured surface of a zeolite shaped body of the third invention is observed by a scanning electron microscope (SEM) and in order to make the entire microstructure observable, SEM photographs are taken while the zeolite particles with the diameter of about 1 μm being magnified in 1,500 or less magnification and those with the diameter of about 8 μm being magnified in 500 or less magnification (FIG. 33). Using the SEM photographs as bases, replicated figures each divided into white and black parts are produced (FIG. 34).

In this case, the white parts show the sound parts (the parts where the respective particles are clearly observed by grain boundary fraction) and the black parts show the dense parts (the parts where the respective particles are not clearly observed by grain boundary fraction). For the image analysis, as an apparatus, an image analyzer (trade name: Image Analyzer V10, manufactured by Toyobo Co., Ltd.) is used to input the replicated images into a personal computer and the measurement region, the scale and the binary treatment are set (the treatment for identifying the white parts of the replicated figures as zeolite particles and the black parts as non-measured parts, that is, dense parts) to measure the ratio of the area of the sound parts to the entire surface of the fractured surface.

The bending strength is measured according to JIS R1601.

Further, the pressure loss is measured in the same manner as the case of the second invention.

A zeolite shaped body of the third invention has the area of the sound parts in microstructure of the fractured surface preferably of 70% or more in the entire area of the fractured surface and more preferably 90% or more, a bending strength preferably of 1.5 MPa or higher and more preferably 6.0 MPa or higher, and a difference in pressure between the feed side and the permeation side (pressure loss) preferably of 1.0 atmospheric pressure or lower and more preferably 0.6 atmospheric pressure lower at 10 ml/cm$^2$·min of helium gas permeation flux when the thickness is adjusted to be 1.8 mm.

A zeolite shaped body production method of the third invention is characterized by comprising the processss of adding a tetrapropylammonium hydroxide (TPAOH) solution to silica sol in such a manner that the mole ratio of mixing ratio (TPA/SiO$_2$) of tetrapropylammonium ion (TPA) to said silica sol becomes 0.015 to 0.08, preferably 0.02 to 0.06, drying the prepared solution by kneading the solution, wet pulverizing the obtained dried gel, spraying thus obtained slurry to drying, shaping thus obtained dried granular substance, and subjecting thus shaped body to crystallization treatment.

In this case, as a method for drying a slurry by spraying, usable is, for example, a spraying and drying apparatus for a solution and a slurry such as a spray drier, a fluid bed granulation dryer and the like. To dry the produced slurry in the third invention, a spray drier is used. The produced slurry is transported to a spraying nozzle tip by a liquid sending pump, and the slurry is sprayed from a nozzle tip, dried in a drying chamber where dry air is circulated, and recovered. At this time, the air circulated in the drying chamber is previously heated to 180° C. in the periphery of the spraying port of the slurry and the pressurized air, however the temperature may be changed depending on the volume of the drying chamber and it is therefore not particularly restricted.

Further, the spray drying of a slurry by a spray drier is known as a granulation method for a ceramic fine powder suitable for pressing and since granulation can be performed by instantaneous heat drying, the drying is not affected by the raw material composition. Consequently, even in the case of the raw material containing silica sol and tetrapropylammonium ion (TPA), if the composition has the prescribed mixing ratio (TPA/SiO$_2$ mole ratio), a zeolite shaped body can be obtained by spraying, drying and subjecting to crystallization treatment independently of the TPA raw material.

More practically, at first, silica sol and a tetrapropylammonium hydroxide (TPAOH) solution are mixed. At this time, if the mixing ratio (TPA/SiO$_2$ mole ratio) of tetrapropylammonium ion (TPA) and silica sol is in a range of 0.015 to 0.08 by mole, the average particle diameter of the zeolite shaped body is not changed and the bending strength is 1.5 MPa or higher, which is required for a substrate to be used for production of a zeolite layered composite, (the strength high enough to avoid the damage of a zeolite membrane in hydrothermal synthesis environments and the damage even after membrane formation.) and for that, the mixing ratio may be adjustable within said range. The raw materials of tetrapropylammonium ion (TPA) may be a tetrapropylammonium hydroxide (TPAOH) solution, tetrapropylammonium bromide (TPABr), or a mixture of these two raw materials. If the mole ratio of TPA/SiO$_2$ is kept in prescribed value in said produced solution, an alkaline source such as sodium hydroxide, potassium hydroxide, and the like may be added to adjust pH, if necessary.

In the examples of the third invention, the TPA/SiO$_2$ mole ratio is adjusted to be 0.04 at which the bending strength becomes the maximum and as a tetrapropylammonium ion (TPA) source, a tetrapropylammonium hydroxide (TPAOH) solution is used to produce the solution.

Then, in order to dry the produced solution once, the produced solution is added to a Teflon beaker and stirred by a magnetic stirrer and then, while being heated in a thermostat at a prescribed temperature, the solution is continuously manually stirred with a Teflon rod and kneaded to evaporate water and obtain a dried gel. The stirring and kneading in this case maybe carried out using a heating kneader or the like.

Then, in order to produce a slurry of the dried gel, the dried gel obtained by stirring and kneading, distilled water, and ball for pulverization are added to a Teflon container to carry out wet ball mill pulverization. At this time, other than the wet ball mill pulverization, for example, the dried gel may finely be pulverized by a medium stirring and pulverizing apparatus (an attriter) and then mixed with a prescribed amount of distilled water to produce a slurry.

Then, the slurry is sprayed and dried by the spraying method as described above to obtain a dried gel granulated product.

Then, the dried gel granulated product is shaped by properly forming the product in a prescribed shape by a uniaxial pressing with a die (the total pressure 1,000 kgf) and then carrying out cold isostatic pressing to obtain a dried gel shaped body. At this time, the pressure of the cold isostatic pressing is preferable to be adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

Further, the zeolite shaped body production method of the third invention may comprises processes of adding a tetrapropylammonium hydroxide (TPAOH) solution to silica sol in such a manner that the mole ratio of mixing ratio (TPA/SiO$_2$ mole ratio) of tetrapropylammonium ion (TPA) and the silica sol becomes a range of 0.015 to 0.08, spraying thus obtained solution to dry, shaping the obtained dried gel, and subjecting thus shaped gel to crystallization treatment.

More practically, at first, silica sol and a tetrapropylammonium hydroxide (TPAOH) solution are mixed. At this time, if the mixing ratio (TPA/SiO$_2$ by mole ratio) of tetrapropylammonium ion (TPA) and silica sol is in a range of 0.015 to 0.08 by mole, preferably in a range of 0.02 to 0.06 by mole, the average particle diameter of the zeolite shaped body is not changed and the bending strength is 1.5 MPa or higher, which is required for a substrate to be used for production of a zeolite layered composite, and for that, the mixing ratio may be adjustable within above described any range. The raw materials of tetrapropylammonium ion (TPA) may be a tetrapropylammonium hydroxide (TPAOH) solution, tetrapropylammonium bromide (TPABr), or a mixture of these two raw materials. Further, if the mole ratio of TPA/SiO$_2$ is kept in prescribed value in said produced solution, an alkaline source such as sodium hydroxide, potassium hydroxide, and the like may be added to adjust pH, if necessary.

Incidentally, in the examples of the third invention, the TPA/SiO$_2$ mole ratio is adjusted to be 0.04 at which the bending strength becomes the maximum and as a tetrapropylammonium ion (TPA) source, a tetrapropylammonium hydroxide (TPAOH) solution is used to produced the solution.

Then, said solution is sprayed and dried by the spraying method as described above to obtain a dried gel.

Then, the dried gel is shaped by properly forming the product in a prescribed shape by a uniaxial pressing with a die (the total pressure 1,000 kgf) and then carrying out cold isostatic pressing to obtain a dried gel shaped body. At this time, the pressure of the cold isostatic pressing is preferable to be adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

The method for drying by spraying in such a manner can carry out drying more homogeneously and prevent the microstructure after the crystallization treatment more efficiently from being coarsened and degranulated than a conventional method for drying by kneading.

A zeolite layered intermediate body of the third invention is characterized by comprising a zeolite shaped body and a template-containing zeolite having the composition same as or similar to that of the shaped body and formed on the shaped body.

The formation method of the template-containing zeolite is not particularly restricted, and applicable are, for example, a hydrothermal synthesis method and a vapor phase transport method and the like.

Further, a zeolite layered composite of the third invention is characterized by comprising a zeolite shaped body and a zeolite membrane formed thereon and being produced by removing the template from said zeolite shaped body and said template-containing zeolite membrane by calcining said zeolite layered intermediate body.

In this case, since said zeolite layered composite is to be employed effectively for a gas separation membrane of a molecular sieve membrane and a pervaporation membrane, a template-containing zeolite membrane or a zeolite membrane, from which the template is removed, to be layered on a zeolite shaped body is required to have sufficient thickness so as to prevent exposure of the zeolite shaped body and to be a dense membrane. Further, in the case where those containing a template are used as a zeolite shaped body, a template-containing zeolite membrane to be layered thereon is required to be made of a zeolite with the composition same as or similar to that of the zeolite shaped body, including that the membrane contains the same template.

A zeolite layered intermediate body production method of the third invention is characterized by comprising the processes of adding a tetrapropylammonium hydroxide (TPAOH) solution to silica sol in such a manner that the mole ratio of mixing ratio (TPA/SiO$_2$) of tetrapropylammonium ion (TPA) and the silica sol becomes 0.015 to 0.08, drying the produced solution by kneading the solution, wet pulverizing the obtained dried gel, spraying thus obtained slurry to dry, shaping the obtained dried gel, subjecting thus shaped gel to crystallization treatment to obtain a zeolite shaped body, immersing the obtained zeolite shaped body in a solution having the same as or similar composition to that of the prepared solution, and forming a template-containing zeolite membrane on the zeolite shaped body by hydrothermally synthesizing it thereon to produce a layered body comprising the zeolite shaped body and the template-containing zeolite membrane. More practical description will be given in the description of a zeolite layered composite production method of the third invention.

Further, the method may be a method characterized by comprising the processes of adding a tetrapropylammonium hydroxide (TPAOH) solution to silica sol in such a manner that the mole ratio of mixing ratio (TPA/SiO$_2$) of tetrapropylammonium ion (TPA) and the silica sol becomes 0.015 to 0.08, spraying thus prepared solution to dry, shaping the dried gel, subjecting the shaped product to crystallization treatment to obtain a zeolite shaped body, immersing the obtained zeolite shaped body in a solution with the same or similar composition as or to that of the solution, and forming a template-containing zeolite membrane on the zeolite shaped body by hydrothermally synthesizing it thereon to produce a layered body comprising the zeolite shaped body and the template-containing zeolite membrane. It will be described in the description of a zeolite layered composite production method of the third invention.

A zeolite layered composite production method of the third invention is characterized by comprising the processes of adding a tetrapropylammonium hydroxide (TPAOH) solution to silica sol in such a manner that the mole ratio of mixing ratio (TPA/SiO$_2$) of tetrapropylammonium ion (TPA) and the silica sol becomes 0.015 to 0.08, drying thus prepared solution by kneading the solution, wet pulverizing the obtained dried gel, drying the obtained slurry by spraying, shaping the obtained dried granulated product, subjecting the shaped gel to crystallization treatment to obtain a zeolite shaped body, immersing the obtained zeolite shaped body in a solution having the same or similar composition as or to that of the prepared solution, forming a template-containing zeolite membrane on the zeolite shaped body by hydrothermally synthesizing it thereon to produce a layered body comprising the zeolite shaped body and the template-containing zeolite membrane, and then simultaneously removing the template by calcining the layered body.

More practically, at first, silica sol and a tetrapropylammonium hydroxide (TPAOH) solution are mixed. At this time, if the mixing ratio (TPA/SiO$_2$ mole ratio) of tetrapropylammonium hydroxide (TPAOH) and silica sol is in a range of 0.015 to 0.08 by mole, preferably 0.02 to 0.06, the average particle diameter of the zeolite shaped body is not changed and the bending strength is 1.5 MPa or higher, which is required for a substrate to be used for production of a zeolite layered composite and for that, the mixing ratio may be adjustable within said any range of mole ratio. The raw materials of tetrapropylammonium ion (TPA) may be a tetrapropylammonium hydroxide (TPAOH) solution, tetrapropylammonium bromide (TPABr), or a mixture of these two raw materials. If the mole ratio of TPA/SiO$_2$ is kept in prescribed value in the produced solution, an alkaline source such as sodium hydroxide, potassium hydroxide, and the like may be added to adjust pH, if necessary.

In the examples of the third invention, the TPA/SiO$_2$ mole ratio is adjusted to be 0.04 at which the bending strength becomes the maximum and as a tetrapropylammonium ion (TPA) source, a tetrapropylammonium hydroxide (TPAOH) solution is used to produce the solution.

Then, in order to dry the produced solution once, the produced solution is added to a Teflon beaker and stirred by a magnetic stirrer and then, while being heated in a thermostat at a prescribed temperature, the solution is continuously manually stirred using a Teflon rod and kneaded to evaporate water and obtain a dried gel. The stirring and kneading in this case maybe carried out using a heating kneader or the like.

Then, in order to produce a slurry of the dried gel, the dried gel, distilled water, and ball for pulverization are added to a Teflon container to carry out wet ball mill pulverization. At this time, other than the wet ball mill pulverization, for example, the dried gel may finely be pulverized by a medium stirring and pulverizing apparatus (an attriter) and then mixed with a prescribed amount of distilled water to produce a slurry.

Then, the slurry is sprayed and dried by the spraying method as described above to obtain a dried gel granulated product.

Then, the dried gel granulated product is shaped by properly forming the product in a prescribed shape by a uniaxial pressing with a die (the total pressure 1,000 kgf) and then carrying out cold isostatic pressing to obtain a dried gel shaped body. At this time, the pressure of the cold isostatic pressing is preferable to be adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

Layering a zeolite membrane on the zeolite shaped body obtained in such a manner is carried out as follows.

A zeolite layered composite is obtained by adding a TPAOH solution, TPABr, and distilled water to silica sol in such a manner that the mole ratio of SiO$_2$/TPAOH/TPABr/water becomes a prescribed value to prepare a mixed solution, charging the obtained solution to a pressure vessel, immersing a zeolite shaped body in the prepared solution, causing reaction for 1 hour or longer in an oven at 100° C. or higher to form a sufficiently thick and dense layer of a template-containing zeolite membrane on the zeolite shaped body and to obtain a zeolite layered intermediate body, and calcining the zeolite layered intermediate body. In the examples of the third invention, reaction is carried out for 18 hours in an oven at 180° C. to form a dense layer of a zeolite membrane with the thickness of 20 μm or thicker on the zeolite shaped body.

Incidentally, if the mole ratio of SiO$_2$/tetrapropylammonium ion (TPA)/water is kept in prescribed value, an alkaline source such as sodium hydroxide, potassium hydroxide, and the like may be added to adjust pH, if necessary.

The zeolite layered composite production method of the third invention may comprise processs of adding a tetrapropylammonium hydroxide (TPAOH) solution to silica sol in such a manner that the mole ratio of mixing ratio (TPA/SiO$_2$) of tetrapropylammonium ion (TPA) to the silica sol becomes 0.015 to 0.08, preferably 0.02 to 0.06, spraying thus prepared solution to dry, shaping the obtained dried gel, and subjecting thus shaped product to crystallization treatment to obtain a zeolite shaped body, immersing the obtained zeolite shaped body in a solution with the same or similar composition as or to that of the solution, forming a template-containing zeolite membrane on the zeolite shaped body by hydrothermally synthesizing it thereon to produce a layered body comprising the zeolite shaped body and the template-containing zeolite membrane, and simultaneously removing the template by calcining the obtained layered body.

More practically, at first, silica sol and a tetrapropylammonium hydroxide (TPAOH) solution are mixed. At this time, if the mixing ratio (TPA/SiO$_2$ mole ratio) of tetrapropylammonium hydroxide (TPAOH) and silica sol is in a range of 0.015 to 0.08 by mole, the average particle diameter of the zeolite shaped body is not changed and the bending strength is 1.5 MPa or higher, which is required for a substrate to be used for production of a zeolite layered composite, and for that, the mixing ratio may be adjustable within said range. Further, the raw materials of tetrapropylammonium ion (TPA) may be a tetrapropylammonium hydroxide (TPAOH) solution, tetrapropylammonium bromide (TPABr), or a mixture of these two raw materials. If the mole ratio of TPA/SiO$_2$ is kept in prescribed value in the produced solution, an alkaline source such as sodium hydroxide, potassium hydroxide, and the like may be added to adjust pH, if necessary.

In the examples of the third invention, the TPA/SiO$_2$ mole ratio is adjusted to be 0.04 at which the bending strength becomes the maximum and as a tetrapropylammonium ion (TPA) source, a tetrapropylammonium hydroxide (TPAOH) solution is used to produced the solution.

Then, the produced solution is sprayed and dried by the spraying method as described above to obtain a dried gel.

Then, the dried gel is shaped by properly forming the dried gel in a prescribed shape by a uniaxial pressing with a die (the total pressure 1,000 kgf) and then carrying out cold isostatic pressing to obtain a dried gel shaped body. At this time, the pressure of the cold isostatic pressing is preferable to be adjusted within a range of 700 to 7,000 kgf/cm$^2$ so as to make the resulting dried gel shaped body to have a desired density.

Then, the dried gel shaped body obtained in the manner as described above is put on a Teflon plate so as to keep the shaped body from water in a Teflon inner cylinder-attached pressure vessel made of a stainless steel and storing distilled water in the same weight as that of the shaped body and reaction is caused under spontaneous steam pressure for 10 hours in an oven at 180° C. and crystallization is carried out to obtain a zeolite shaped body. The amount of the distilled water at this time is the minimum level of the amount with which the steam pressure reaches the saturated pressure for the volume of the pressure vessel used and if the amount is that level or higher, there is no particular restriction in terms of the relation of a shaped body and distilled water. Further, regarding the reaction temperature and time, since crystallization proceeds at 130° C. or higher for 2 hours or longer, the temperature and the time are not particularly restricted if they are the above mentioned levels or more, respectively.

Layering a zeolite membrane on the zeolite shaped body obtained in such a manner is carried out as follows.

A zeolite layered composite is obtained by adding a TPAOH solution, TPABr, and distilled water to silica sol in such a manner that the mole ratio of $SiO_2$/TPAOH/TPABr/water becomes a prescribed value to prepare a mixed solution, charging the obtained solution to a pressure vessel, immersing a zeolite shaped body in the prepared solution, causing reaction for 1 hour or longer in an oven at 100° C. or higher to form a sufficiently thick and dense layer of a template-containing zeolite membrane on the zeolite shaped body and to obtain a zeolite layered intermediate body, and calcining the zeolite layered intermediate body. In the examples of the third invention, reaction is carried out for 18 hours in an oven at 180° C. to form a dense layer of a zeolite membrane with the thickness of 20 μm or thicker on the zeolite shaped body.

Incidentally, if the mole ratio of $SiO_2$/tetrapropylammonium ion (TPA)/water is kept in prescribed value, an alkaline source such as sodium hydroxide, potassium hydroxide, and the like may be added to adjust pH, if necessary.

Incidentally, as a method zeolite layered composite production method of the third invention, same method as those in the case of the first invention and the second invention may be employed.

Hereinafter, the present invention will more practically be described according to the examples, however the invention is not at all restricted to those examples.

EXAMPLES 1 TO 5 COMPARATIVE EXAMPLES 1 TO 7

The First Invention (1)

A Teflon beaker of 200 ml capacity was charged with about 30% by weight of silica sol (trade name: Snowtex S, produced by Corporation Nissan Chemical) and a 10% tetrapropylammonium hydroxide solution (produced by Wako Pure Chemical Industries, Ltd.) and the mixing ratio (TPA/$SiO_2$) of TPA (tetrapropylammonium ion) and $SiO_2$ was separately adjusted as shown in Table 1 in mole ratio and the resulting each solution was stirred at room temperature for 30 minutes by a magnetic stirrer and after that, while being heating at 80° C., each solution was continuously stirred and kneaded to evaporate water and to obtain a colorless dried gel with 10% by weight or lower water content. The obtained each dried gel was subjected to x-ray diffraction to investigate the crystal structure to find it was amorphous.

The obtained each dried gel was pulverized in an agate crucible and passed through meshes of 355 μm to obtain an under-mesh powder and after that, each powder was pressed by a uniaxial pressing with a die at the entire pressure of 1 t to separately obtain a rod-like shaped body of 4 mm×4 mm×50 mm.

The obtained each shaped body was set on a Teflon plate so as to keep each shaped body from water in a Teflon inner cylinder-attached pressure vessel made of a stainless steel and filled with distilled water in a half of the weight of the shaped body and reaction was caused under spontaneous steam pressure for 18 hours in an oven at 180° C. and crystallization is carried out to obtain each zeolite shaped body.

Respective zeolite shaped bodies obtained in the examples 1 to 5 and the comparative examples 1 to 7 were subjected to x-ray diffraction to investigate their crystal phase and find that they were porous bodies of a MFI type zeolite and that the zeolite was completely crystallized in terms of x-ray investigation. Incidentally, the one obtained in the comparative example 1 was not a zeolite.

Then, after being sufficiently dried at 80° C., the respective zeolite shaped bodies obtained in the examples 1 to 5 and the comparative examples 1 to 7 were subjected to 4-point bending strength measurement according to JIS R1601. The results are shown in Table 1.

TABLE 1

| | TPA/$SiO_2$ (mole ratio) | 4-point bending strength (MPa) |
|---|---|---|
| Example 1 | 0.015 | 3.7 |
| Example 2 | 0.020 | 13.6 |
| Example 3 | 0.040 | 15.7 |
| Example 4 | 0.060 | 8.6 |
| Example 5 | 0.080 | 5.2 |
| Comparative example 1 | 0.000 | — |
| Comparative example 2 | 0.005 | 0.5 |
| Comparative example 3 | 0.010 | 0.6 |
| Comparative example 4 | 0.100 | 1.4 |
| Comparative example 5 | 0.120 | 0.9 |
| Comparative example 6 | 0.140 | 0.4 |
| Comparative example 7 | 0.200 | 0.2 |

According to Table 1, the zeolite shaped bodies of completely crystallized zeolites as those of the examples 1 to 5 were found having the strength of 3 MPa or higher by adjusting the mixing ratio (TPA/$SiO_2$) of TPA (tetrapropylammonium ion) and $SiO_2$ to be 0.015 to 0.08 by mole.

EXAMPLES 6 TO 11 COMPARATIVE EXAMPLES 8 TO 10

The First Invention (2)

A Teflon beaker of 200 ml capacity was charged with about 30% by weight of silica sol (trade name: Snowtex S, produced by Corporation Nissan Chemical) and a 10% tetrapropylammonium hydroxide solution (produced by Wako Pure Chemical Industries, Ltd.) and the mixing ratio (TPA/$SiO_2$) of TPA (tetrapropylammonium ion) and $SiO_2$ was separately adjusted as shown in Table 2 [in mole ratio] and the resulting each solution was stirred at room temperature for 30 minutes by a magnetic stirrer and after that, while being heating at 80° C., each solution was further continuously stirred and kneaded to evaporate water and to obtain a colorless dried gel with 10% by weight or lower water content. The obtained each dried gel was subjected to x-ray diffraction to investigate the crystal structure to find it was amorphous.

The obtained each dried gel was pulverized in an agate crucible and passed through meshes of 355 μm to obtain an under-mesh powder and after that, each powder was pressed by a uniaxial press with a die at the entire pressure of 1 t to separately obtain a rod-like shaped body of 4 mm×4 mm×50 mm.

The obtained each shaped body was set on a Teflon plate so as to keep each shaped body from water in a Teflon inner cylinder-attached pressure vessel made of a stainless steel and filled with distilled water in a half of the weight of the shaped body and reaction was caused under spontaneous steam pressure for 10 hours in an oven at 130° C. and crystallization is carried out to obtain each zeolite shaped body.

Respective zeolite shaped bodies obtained in the examples 6 to 11 and the comparative examples 8 to 10 were subjected to x-ray diffraction to investigate their crystal phase and find that those obtained in the comparative examples 9 to 10 were porous bodies of a MFI type zeolite and that those obtained in the examples 6 to 11 were porous zeolite bodies still under crystalization comprising a MFI type zeolite and amorphous zeolite. Incidentally, the one obtained in the comparative example 8 was not a zeolite.

Then, after being sufficiently dried at 80° C., the respective zeolite shaped body obtained in the examples 6 to 11 and the comparative examples 8 to 10 were subjected to 4-point bending strength measurement according to JIS R1601. The results are shown in Table 2.

TABLE 2

|  | $TPA/SiO_2$ (mole ratio) | 4-point bending strength (MPa) |
|---|---|---|
| Example 6 | 0.02 | 1.8 |
| Example 7 | 0.04 | 5.7 |
| Example 8 | 0.06 | 14.1 |
| Example 9 | 0.08 | 13.2 |
| Example 10 | 0.10 | 4.7 |
| Example 11 | 0.12 | 2.3 |
| Comparative example 8 | 0.00 | — |
| Comparative example 9 | 0.14 | 1.2 |
| Comparative example 10 | 0.20 | 0.2 |

According to Table 2, the zeolite shaped bodies of zeolites still under crystallization as those of the examples 6 to 11 were found having the strength of 1.5 MPa or higher by adjusting the mole ratio ($TPA/SiO_2$) of TPA (tetrapropylammonium ion) and $SiO_2$ to be 0.02 to 0.12.

EXAMPLES 12

The First Invention (3)

A sol for membrane formation was produced by mixing 15.26 g of a 10% tetrapropylammonium hydroxide solution (produced by Wako Pure Chemical Industries, Ltd.) and 2.00 g of tetrapropylammonium bromide (produced by Wako Pure Chemical Industries, Ltd.), further adding 49.85 g of distilled water, and 6.00 g of about 30% by weight of silica sol (trade name: Snowtex S, produced by Corporation Nissan Chemical), and stirring the resulting mixture at room temperature for 30 minutes by a magnetic stirrer.

Figure 1:
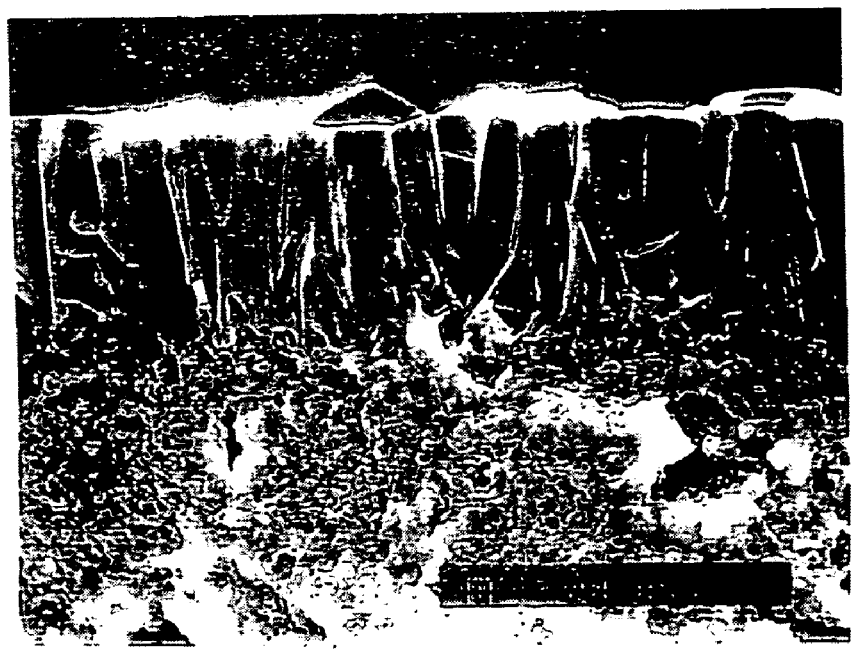
FIG. 1 is a SEM photograph showing the microstructure of the fractured surface of a zeolite layered intermediate body obtained in example 12 of the first invention.
Figure 2:
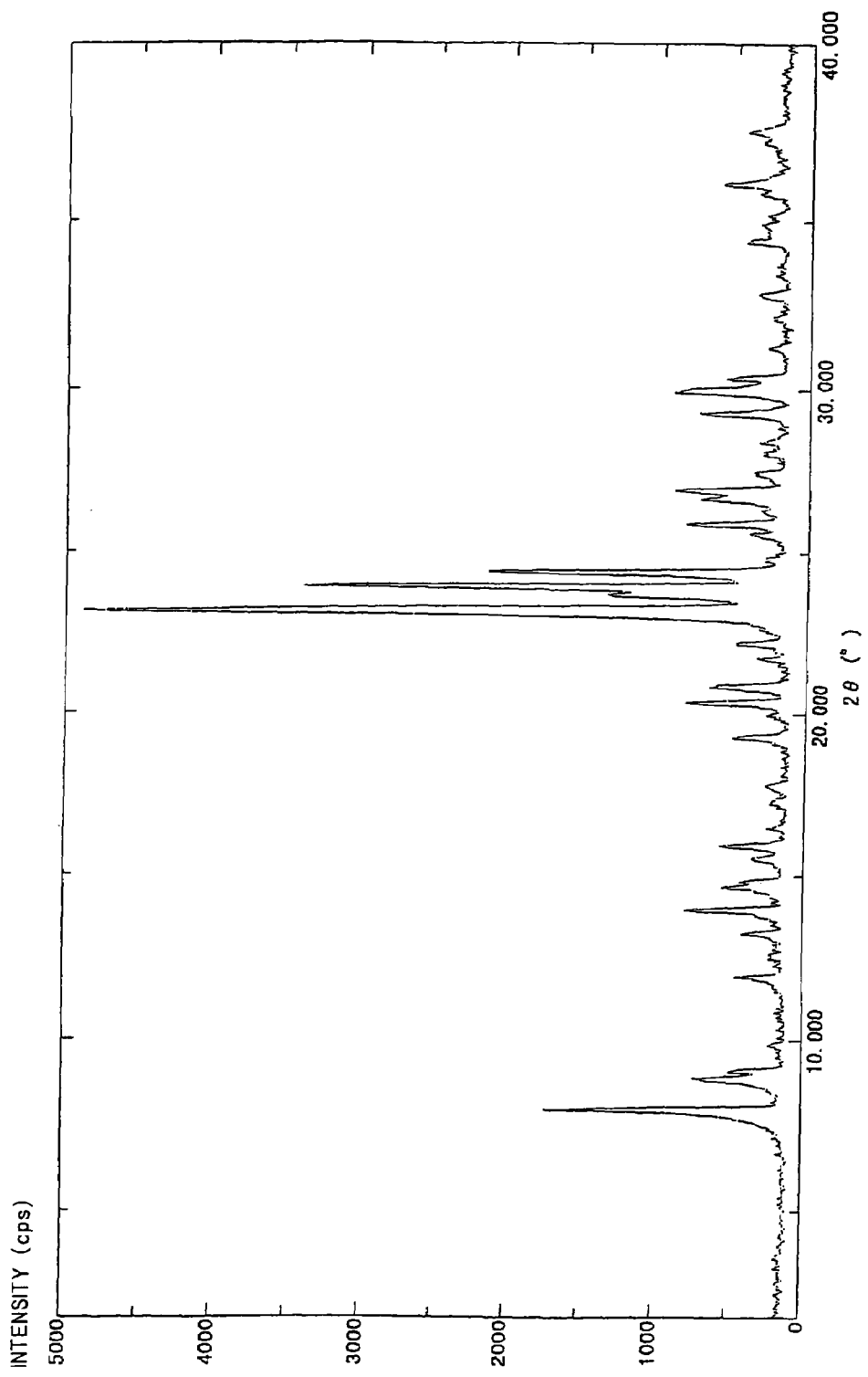
FIG. 2 is a graph showing the x-ray diffraction pattern to show that is of a MFI type zeolite membrane.

The resulting sol was added to a Teflon inner cylinder-attached pressure vessel with 100 ml capacity made of a stainless steel and the zeolite shaped body obtained in the example 3 was immersed in the sol and reacted for 18 hours in an oven at 180° C. Observation of the fractured surface by a scanning electron microscope (SEM) after the reaction made it clear that an about 17 μm thick dense layer was formed on the porous zeolite shaped body as shown in the scanning electron microscope (SEM) photograph of FIG. 1 and it was found by x-ray diffraction that the dense membrane was of a MFI type zeolite membrane.

When the zeolite layered intermediate body obtained as described above was heated to 500° C. and kept at the temperature for 4 hours in an electric furnace to remove tetrapropylammonium, no crack was observed by a Rhodamine test, which will be described later, and no molecule was found permeating by a pervaporation method using triethylbenzene to make it clear that a dense zeolite membrane free of cracks was formed.

EXAMPLE 13

The First Invention (4)

The zeolite shaped body obtained in example 7 was immersed in the sol similar to that of the example 12 and added to a Teflon inner cylinder-attached pressure vessel with 100 ml capacity made of a stainless steel and reacted for 18 hours in an oven at 180° C. Observation of the fractured surface by SEM after the reaction made it clear that a dense layer similar to that in the example 3 was formed on the porous zeolite shaped body and it was found by x-ray diffraction that the dense membrane was of a MFI type zeolite membrane. Further, the parts of the shaped body which were amorphous before the membrane formation were converted into the MFI type zeolite by the membrane formation to obtain a zeolite layered intermediate body comprising the zeolite shaped body and a zeolite membrane formed thereon.

When the zeolite layered intermediate body obtained as described above was heated to 500° C. and kept at the temperature for 4 hours in an electric furnace to remove tetrapropylammonium, as shown in Table 3, no crack was observed by a Rhodamine test and no molecule was found permeating by a pervaporation method using triisopropylbenzene (TIPB) to make it clear that a dense zeolite membrane free of cracks was formed.

COMPARATIVE EXAMPLE 11

The First Invention (5)

A porous aluminum was immersed in the sol produced in the same manner as the example 12 and a zeolite membrane was formed in the same manner as the example 12.

When the resulting membrane was heated to 500° C. and kept at the temperature for 4 hours in an electric furnace to remove tetrapropylammonium, as shown in Table 3, cracks were observed by a Rhodamine test described later and molecules were found permeating by a pervaporation method using triisopropylbenzene to make it clear that the membrane was not a gas tight membrane.

COMPARATIVE EXAMPLE 12

The First Invention (6)

A porous silicon nitride was immersed in the sol produced in the same manner as the example 12 and a zeolite membrane was formed in the same manner as the example 12.

When the resulting membrane was heated to 500° C. and kept at the temperature for 4 hours in an electric furnace to remove tetrapropylammonium, as shown in Table 3, cracks were observed by a Rhodamine test described later and molecules were found permeating by a pervaporation method using triisopropylbenzene to make it clear that the membrane was not a gas tight membrane.

COMPARATIVE EXAMPLE 13

The First Invention (7)

A porous mullite was immersed in the sol produced in the same manner as the example 12 and a zeolite membrane was formed in the same manner as the example 12.

When the resulting membrane was heated to 500° C. and kept at the temperature for 4 hours in an electric furnace to remove tetrapropylammonium, as shown in Table 3, cracks were observed by a Rhodamine test described later and molecules were found permeating by a pervaporation method using triisopropylbenzene to make it clear that the membrane was not a gas tight membrane.

COMPARATIVE EXAMPLE 14

The First Invention (8)

A porous silica glass was immersed in the sol produced in the same manner as the example 12 and a zeolite membrane was formed in the same manner as the example 12.

When the resulting membrane was heated to 500° C. and kept at the temperature for 4 hours in an electric furnace to remove tetrapropylammonium, as shown in Table 3, cracks were observed by a Rhodamine test described later and molecules were found permeating by a pervaporation method using triisopropylbenzene to make it clear that the membrane was not a gas tight membrane.

COMPARATIVE EXAMPLE 15

The First Invention (9)

A porous cordierite was immersed in the sol produced in the same manner as the example 12 and a zeolite membrane was formed in the same manner as the example 12.

When the resulting membrane was heated to 500° C. and kept at the temperature for 4 hours in an electric furnace to remove tetrapropylammonium, as shown in Table 3, cracks were observed by a Rhodamine test described later and molecules were found permeating by a pervaporation method using triisopropylbenzene to make it clear that the membrane was not a gas tight membrane.

nium bromide (TPABr) was added in the form of an aqueous solution of about 2% by weight of sodium hydroxide and the resulting each solution was stirred at room temperature for 30 minutes by a magnetic stirrer and after that, while being heating at 80° C., each solution was continuously stirred and kneaded manually using a Teflon rod to evaporate water and to obtain a colorless dried gel. The obtained each dried gel was subjected to x-ray diffraction to investigate the crystal structure to find it was amorphous.

The obtained each dried gel was pulverized in an agate crucible and passed through meshes of 355 μm to obtain an under-mesh powder and after that, each powder was pressed by a uniaxial press with a die (the entire pressure of 1,000 kgf) to obtain a rod-like shaped body of 5×4×40 mm and a disk-like shaped body of 18 mmφ diameter and 1.8 mm thickness and further shaped by cold isostatic pressing (the entire pressure of 2,500 kgf/cm² to obtain shaped bodies. The obtained each shaped body was set on a Teflon plate so as to keep each shaped body from water in a Teflon inner cylinder-attached pressure vessel of 100 ml capacity made of a stainless steel and filled with distilled water in the same weight as that of each shaped body and reaction was caused under spontaneous steam pressure for 10 hours in an oven at 180° C. Shaped bodies were investigated by x-ray diffraction after the reaction to be found all of their compositions were MFI type zeolites. The shaped bodies were sufficiently dried at 80° C. to obtain zeolite shaped bodies.

Figure 3:
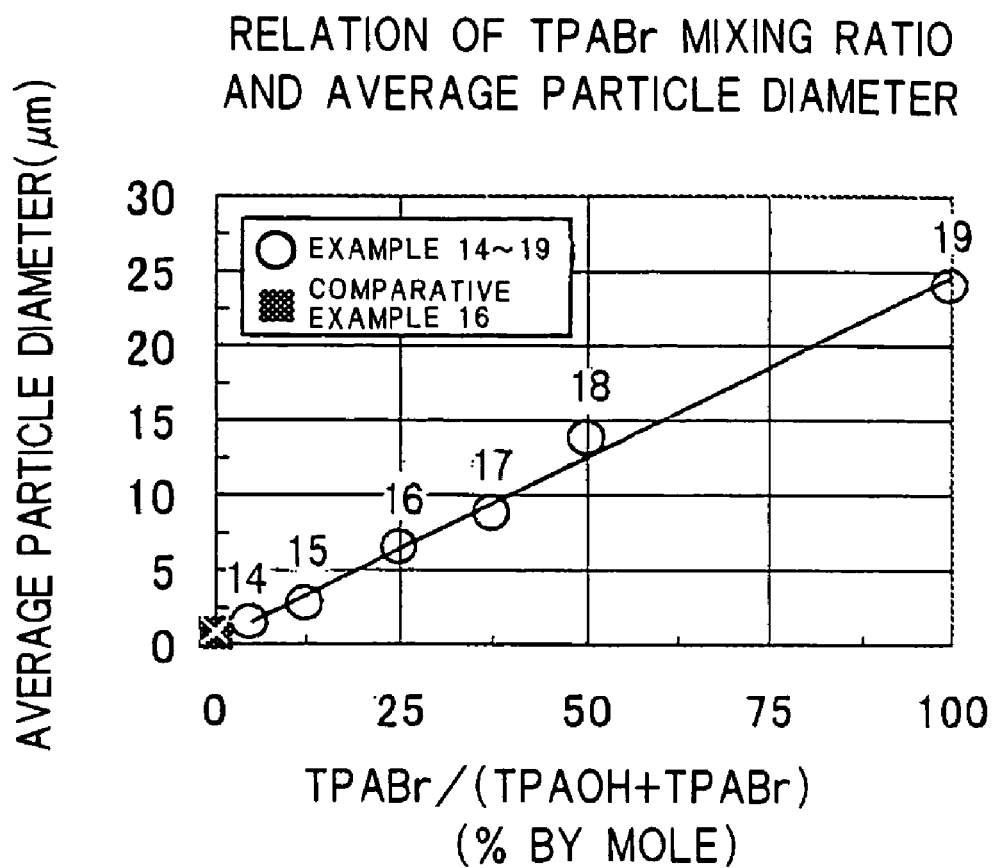
FIG. 3 shows a graph showing the relation between the mixing ratio of tetrapropylammonium bromide (TPABr) to the total amount of tetrapropylammonium ion (TPA), that is, the mixing ratio [TPABr/(TPAOH+TPABr)] to (TPAOH+TPABr), and the average particle diameter in the zeolite shaped bodies obtained in examples 14 to 19 of the second invention and comparative example 16.
Figure 4:
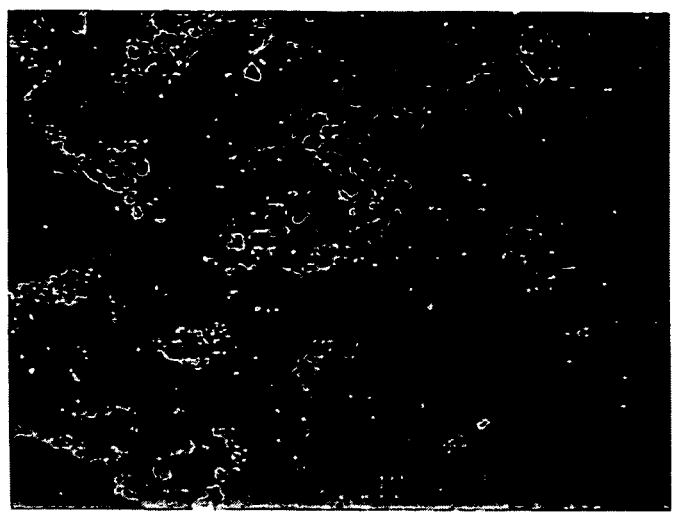
FIG. 4 to FIG. 8 are SEM photographs showing the microstructure of the fractured surface of each zeolite shaped body obtained in examples 14 to 18 of the second invention.
Figure 5:
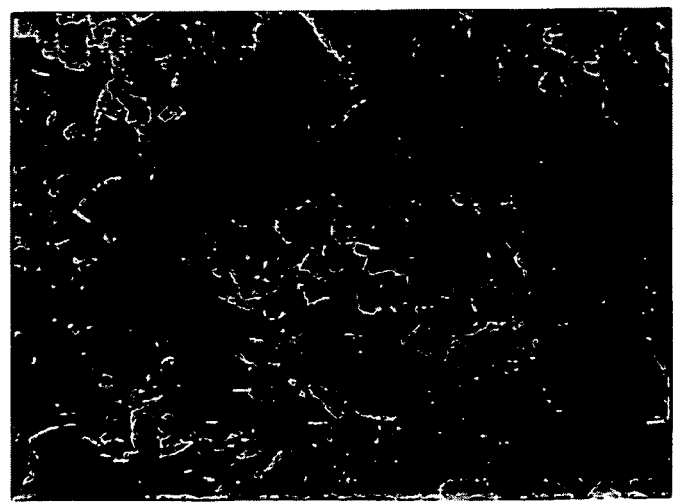
Figure 6:
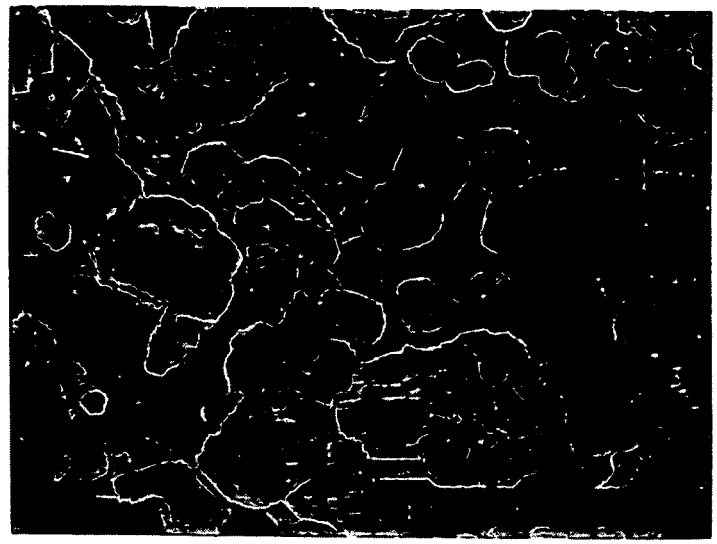
Figure 7:
Figure 8:

The microstructure of the fractured surface of each zeolite shaped body obtained in such a manner as described above was observed by a scanning electron microscope (SEM) as described above and according to the photograph, the average particle diameter was calculated to find, as shown in Table 4 and FIG. 3, that as the mixing ratio [TPABr/(TPAOH+TPABr)] of tetrapropylammonium bromide (TPABr) to the total amount of tetrapropylammonium ion (TPA) was

TABLE 3

| | Example 12 | Example 13 | Comparative example 11 | Comparative example 12 | Comparative example 13 | Comparative example 14 | Comparative example 15 |
|---|---|---|---|---|---|---|---|
| Cracks | None | None | Observed | Observed | Observed | Observed | Observed |
| TIPB molecule | Impermeable | Impermeable | Permeable | Permeable | Permeable | Permeable | Permeable |

EXAMPLES 14 TO 18

The Second Invention (1)

A Teflon beaker of 200 ml capacity was charged with about 30% by weight of silica sol (trade name: Snowtex S, produced by Corporation Nissan Chemical), a 10% tetrapropylammonium hydroxide solution (produced by Wako Pure Chemical Industries, Ltd.), and tetrapropylammonium bromide (TPABr) (produced by Wako Pure Chemical Industries, Ltd.) while the mixing ratio (TPA/SiO$_2$) of TPA (tetrapropylammonium ion) and silica sol being adjusted to be 0.04 by mole and the respective mixing ratios [TPAOH/(TPAOH+TPABr) and TPABr/(TPAOH+TPABr)] of tetrapropylammonium hydroxide (TPAOH) and tetrapropylammonium bromide (TPABr) to the total amount of tetrapropylammonium ion (TPA) being separately adjusted as shown in Table 4 in mole %, and further sodium hydroxide in the same amount (by mole) as the addition amount (by mole) of tetrapropylammoincreased to 5, 12.5, 25, 37.5, and 50% by mole, the average particle diameter was increased to 1.5, 2.7, 6.4, 8.8, and 13.9 μm.

The scanning electron microscope (SEM) photographs of the examples 14 to 18 are shown in FIG. 4 to FIG. 8, respectively.

Figure 9:
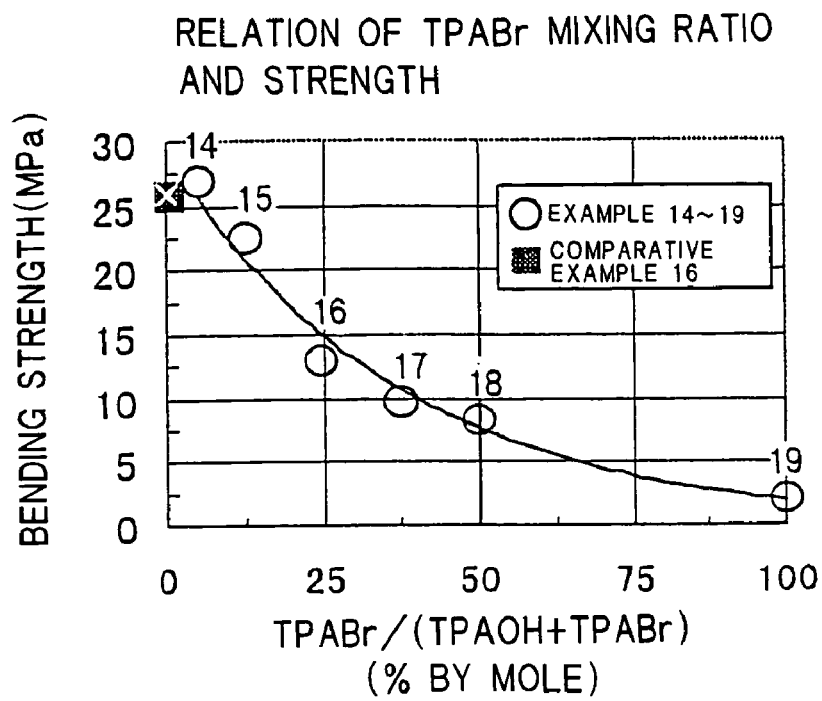
FIG. 9 shows a graph showing the relation between the mixing ratio (TPABr/TPA) of tetrapropylammonium bromide (TPABr) to the total amount of tetrapropylammonium ion (TPA) and the bending strength of each zeolite shaped body obtained in examples 14 to 19 of the second invention and comparative example 16.
Figure 10:
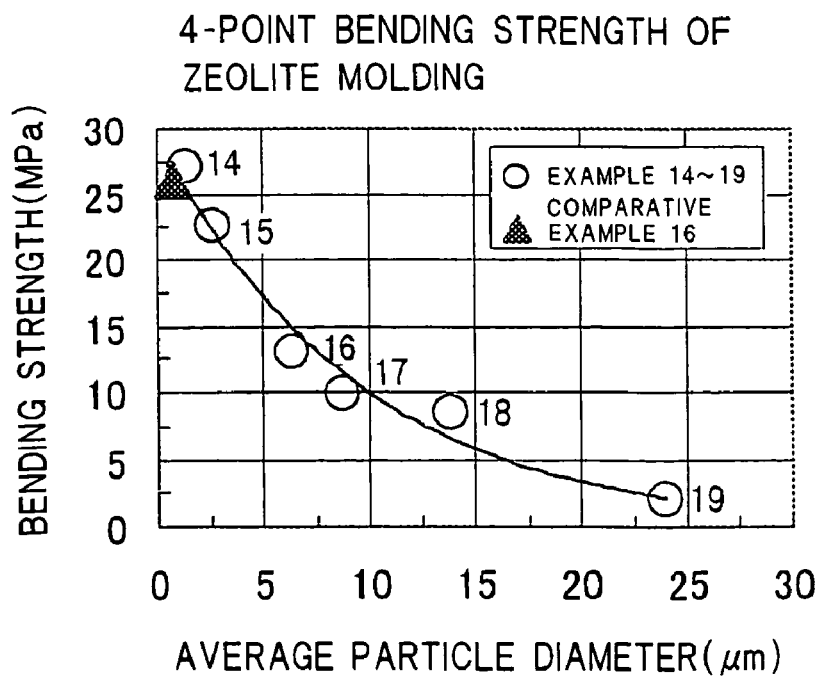
FIG. 10 shows a graph showing the relation between the average particle diameter and the four-point bending strength in each zeolite shaped body obtained in examples 14 to 19 of the second invention and comparative example 16.

Then, the rod-like respective zeolite shaped bodies were subjected to 4-point bending strength measurement according to JIS R1601 to find, as shown in Table 4 and FIG. 9, that as the mixing ratio [TPABr/(TPAOH+TPABr)] of tetrapropylammonium bromide (TPABr) to the total amount of tetrapropylammonium ion (TPA) was increased to 5, 12.5, 25, 37.5, and 50% by mole, the bending strength was decreased and also, as shown in FIG. 10, that as the average particle diameter was increased, the bending strength was decreased.

Figure 11:
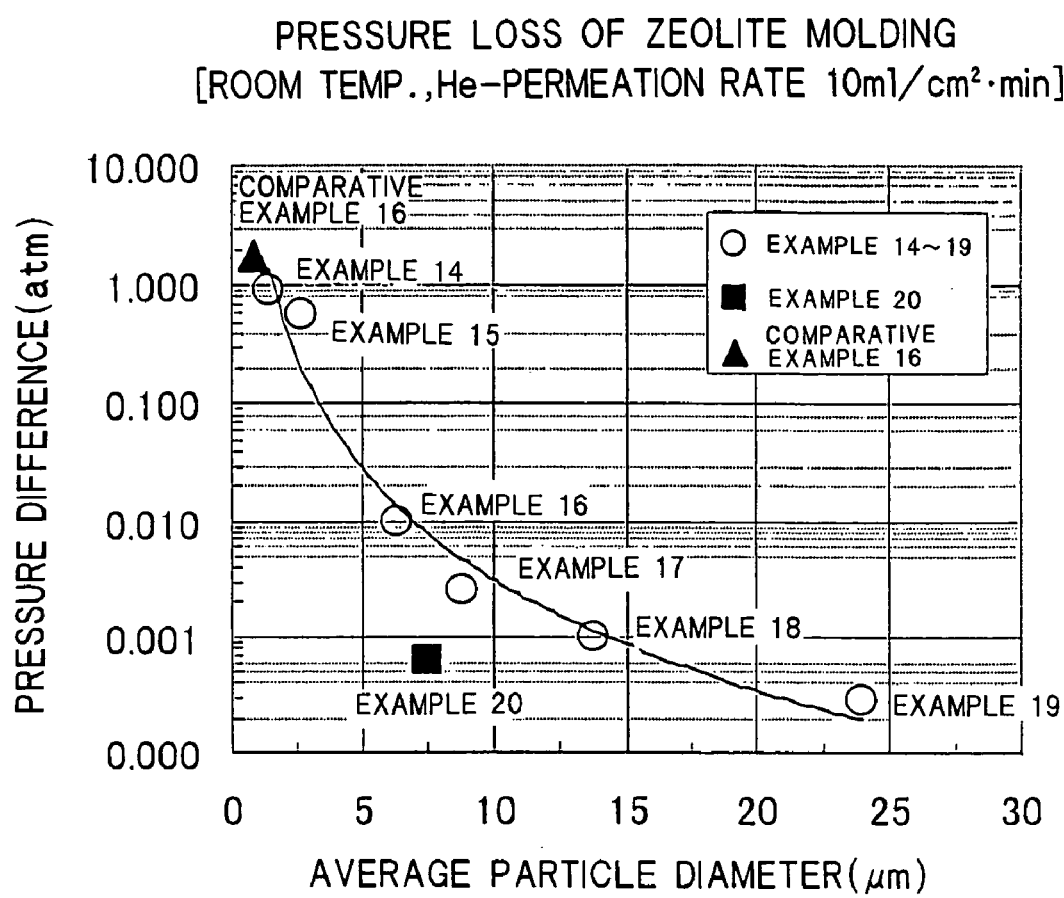
FIG. 11 shows a graph showing the relation between the average particle diameter and the pressure loss in each zeolite shaped body obtained in examples 14 to 20 of the second invention and comparative example 16.

Further, the disk-like respective zeolite shaped bodies were subjected to pressure loss measurement to find, as shown in Table 4, that as the mixing ratio [TPABr/(TPAOH+TPABr)] of tetrapropylammonium bromide (TPABr) to the total amount of tetrapropylammonium ion (TPA) was increased to 5, 12.5, 25, 37.5, and 50% by mole, the pressure loss was decreased and also, as shown in FIG. 11, that as the average particle diameter was increased, the pressure loss was decreased.

EXAMPLE 19

The Second Invention (2)

A Teflon beaker of 200 ml capacity was charged with about 30% by weight of silica sol (trade name: Snowtex S, produced by Corporation Nissan Chemical) and tetrapropylammonium bromide (TPABr) (produced by Wako Pure Chemical Industries, Ltd.) while the mixing ratio (TPA/$SiO_2$) of TPA (tetrapropylammonium ion) of TPABr and silica sol being adjusted to be 0.04 by mole ratio and further sodium hydroxide in the same amount (by mole) as the addition amount (by mole) of tetrapropylammonium bromide (TPABr) was added in the form of an aqueous solution of about 2% by weight of sodium hydroxide and the resulting solution was stirred at room temperature for 30 minutes by a magnetic stirrer and after that, while heating at 80° C., the solution was continuously stirred and kneaded manually using a Teflon rod to evaporate water and to obtain a colorless dried gel. The obtained dried gel was subjected to x-ray diffraction to investigate the crystal structure to find it was amorphous.

The obtained dried gel was processed in the same manner as in the case of the examples 14 to 18 to obtain each zeolite shaped body.

Figure 12:
FIG. 12 to FIG. 14 show SEM photographs showing the microstructure of the fractured surface of each zeolite shaped body obtained in examples 19 to 20 of the second invention and comparative example 16.

The microstructure of the fractured surface of each zeolite shaped body was observed by a scanning electron microscope (SEM) in the same manner as described above in the examples 14 to 18, and according to the photograph, the average particle diameter was calculated to find the average particle diameter was 24 µm (reference to FIG. 3). The scanning electron microscope (SEM) photograph is shown in FIG. 12.

Further, the rod-like zeolite shaped body was subjected to 4-point bending strength measurement in the same manner as the examples 14 to 18 to find, as shown in Table 4, FIG. 9, and FIG. 10, it was 2 MPa.

Further, the disk-like zeolite shaped body was subjected to pressure loss measurement in the same manner as the examples 14 to 18 to find, as shown in Table 4 and FIG. 11, it was $0.3 \times 10^{-3}$ atmospheric pressure.

EXAMPLE 20

The Second Invention (3)

A Teflon beaker of 200 ml capacity was charged with about 30% by weight of silica sol (trade name: Snowtex S, produced by Corporation Nissan Chemical) and a 10% tetrapropylammonium hydroxide (TPAOH) solution (produced by Wako Pure Chemical Industries, Ltd.) while the mixing ratio (TPA/$SiO_2$) of TPA (tetrapropylammonium ion) of the TPAOH solution and silica sol was adjusted to be 0.04 by mole ratio and the resulting solution was stirred at room temperature for 30 minutes by a magnetic stirrer to obtain a mixed solution of tetrapropylammonium hydroxide (TPAOH) and silica sol for a spray drier. The mixed solution was dried by a spray drier apparatus (trade name: Valvis Mini Spray GA 32 model manufactured by Yamato Science Co., Ltd.) in conditions of 1 kgf/cm² spraying air pressure, 0.4 m³/min dried air flow rate, 3 ml/min solution feeding rate, and 180° C. blowing temperature to obtain a dried gel. The obtained dried gel was subjected to x-ray diffraction to investigate the crystal structure to find it was amorphous.

The obtained dried gel was processed in the same manner as in the case of the examples 14 to 18 to obtain each zeolite shaped body.

Figure 13:
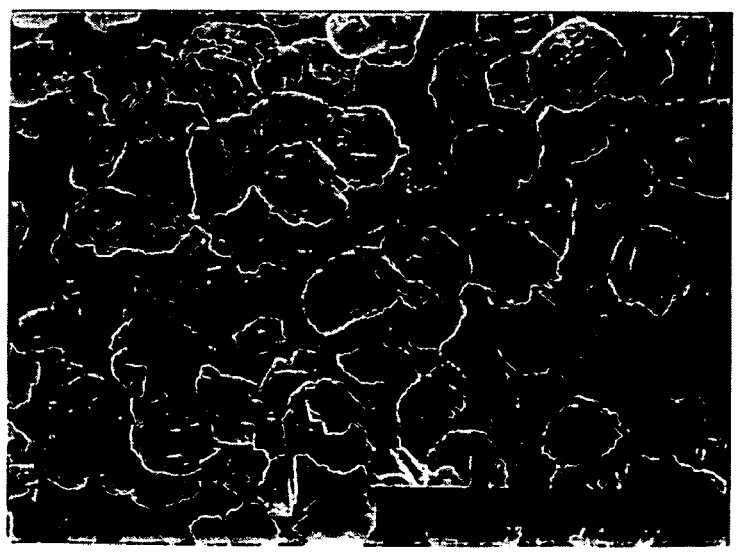

The microstructure of the fractured surface of each zeolite shaped body was observed by a scanning electron microscope (SEM) in the same manner as described above in the examples 14 to 18 to find the microstructure was free of defects and a homogeneous structure without showing non-denseness and denseness in the granule. According to the photograph, the average particle diameter was calculated to find the average particle diameter was 7.5 µm. The scanning electron microscope (SEM) photograph is shown in FIG. 13.

Further, the rod-like zeolite shaped body was subjected to 4-point bending strength measurement in the same manner as the examples 14 to 18 to find, as shown in Table 4, it was 6 MPa. Further, as shown in Table 4 and FIG. 11, the disk-like zeolite shaped body was subjected to pressure loss measurement in the same manner as the examples 14 to 18 to find it was $0.6 \times 10^{-3}$ atmospheric pressure.

COMPARATIVE EXAMPLE 16

The Second Invention (4)

A Teflon beaker of 200 ml capacity was charged with about 30% by weight of silica sol (trade name: Snowtex S, produced by Corporation Nissan Chemical) and a 10% tetrapropylammonium hydroxide (TPAOH) solution (produced by Wako Pure Chemical Industries, Ltd.) while the mixing ratio (TPA/$SiO_2$) of TPA (tetrapropylammonium ion) of the TPAOH solution and silica sol being adjusted to be 0.04 by mole and the resulting solution was stirred at room temperature for 30 minutes by a magnetic stirrer and after that, while being heated at 80° C., the solution was further continuously stirred and kneaded manually by a Teflon rod to evaporate water and obtain a colorless dried gel. The obtained dried gel was subjected to x-ray diffraction to investigate the crystal structure to find it was amorphous.

The obtained dried gel was processed in the same manner as in the case of the examples 14 to 18 to obtain each zeolite shaped body.

Figure 14:
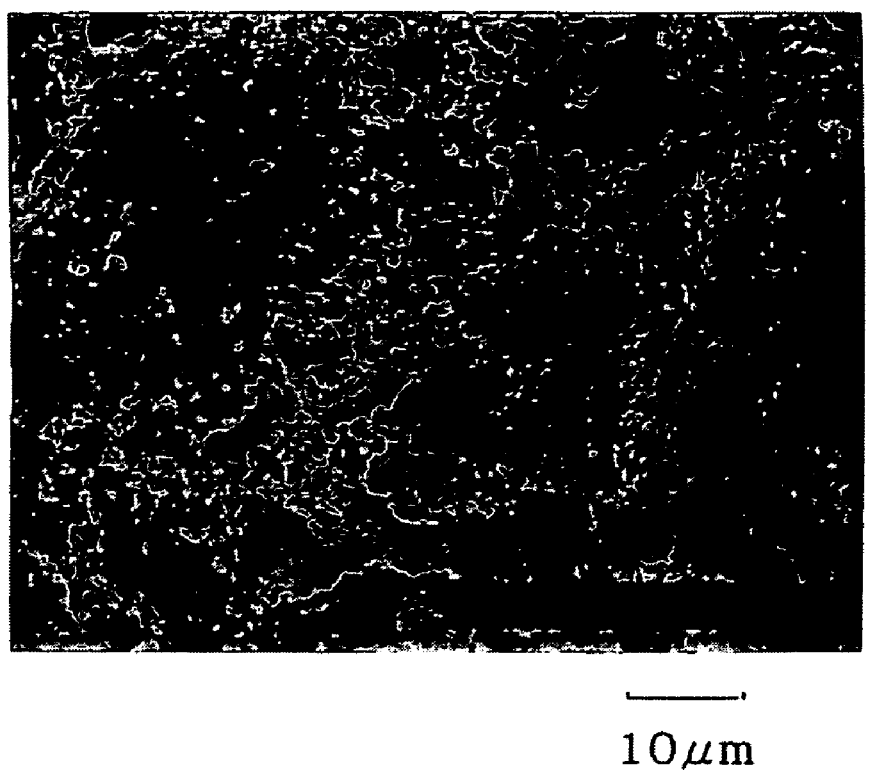

The microstructure of the fractured surface of each zeolite shaped body was observed by a scanning electron microscope (SEM) in the same manner as described above in the examples 14 to 18, and according to the photograph, the average particle diameter was calculated to find the average particle diameter was 0.8 µm (reference FIG. 3). The scanning electron microscope (SEM) photograph is shown in FIG. 14.

Further, the rod-like zeolite shaped body was subjected to 4-point bending strength measurement in the same manner as the examples 14 to 18 to find, as shown in Table 4, FIG. 9, and FIG. 10, it was 26 MPa.

Further, as shown in FIG. 11, the disk-like zeolite shaped body was subjected to pressure loss measurement in the same manner as the examples 14 to 18 to find it was 1.8 atmospheric pressure.

Table 4 collectively shows the results of the measurement for the average particle diameter (µm) of the microstructure of the fractured surface of each zeolite shaped body obtained in examples 14 to 20 and the comparative example 16, the four-point bending strength (MPa) and pressure loss (atm) of each zeolite shaped body obtained in examples 14 to 20 and the comparative example 16. According to Table 4, the zeolite shaped bodies obtained in examples 14 to 20 had practically sufficiently large average particle diameter and high bending strength as compared with those of the zeolite shaped body obtained in the comparative example 16 and their pressure loss was found to be extremely low. Consequently, if a zeolite layered composite comprising a shaped body (a substrate) with such an extremely low pressure loss just like the zeolite shaped bodies obtained in the examples 14 to 20 and a zeolite membrane free of defects such as cracks and layered or formed thereon is used as a gas separation membrane of a molecular sieve membrane and a pervaporation membrane, the composite can be a highly functional and useful material with a high flux.

TABLE 4

| | Mixing ratio to total TPA (% by mole) | | Dried gel production method Heating at 80° C., kneading, drying | Zeolite shaped body | | |
|---|---|---|---|---|---|---|
| | TPAOH | TPABr | | Particle diameter (μm) | 4-point bending strength (MPa) | Pressure loss ΔP (atm) |
| Example 14 | 95.0 | 5.0 | Same above | 1.5 | 27 | 0.9081 |
| Example 15 | 87.5 | 12.5 | Same above | 2.7 | 22 | 0.5652 |
| Example 16 | 75.0 | 25.0 | Same above | 6.4 | 13 | 0.0096 |
| Example 17 | 62.5 | 37.5 | Same above | 8.8 | 10 | 0.0025 |
| Example 18 | 50.0 | 50.0 | Same above | 13.9 | 8 | 0.0010 |
| Example 19 | — | 100 | Same above | 24.0 | 2 | 0.0003 |
| Example 20 | 100 | — | Spray drying of solution | 7.5 | 6 | 0.0006 |
| Comparative example 16 | 100 | — | Heating at 80° C., kneading, drying | 0.8 | 26 | 1.8 |

EXAMPLE 21

The Second Invention (5)

A sol for membrane formation of a zeolite membrane was produced by mixing 15.26g of a 10% tetrapropylammonium hydroxide (TPAOH) solution (produced by Wako Pure Chemical Industries, Ltd.) and 2.00 g of tetrapropylammonium bromide (TPABr) (produced by Wako Pure Chemical Industries, Ltd.), further adding 49.85 g of distilled water and 6.00 g of about 30% by weight of silica sol (trade name: Snowtex S, produced by Corporation Nissan Chemical) in such a manner that the mole ratio of $SiO_2$/TPAOH/TPABr/water becomes 1/0.25/0.25/125, and stirring the resulting mixture at room temperature for 30 minutes by a magnetic stirrer.

Figure 22:
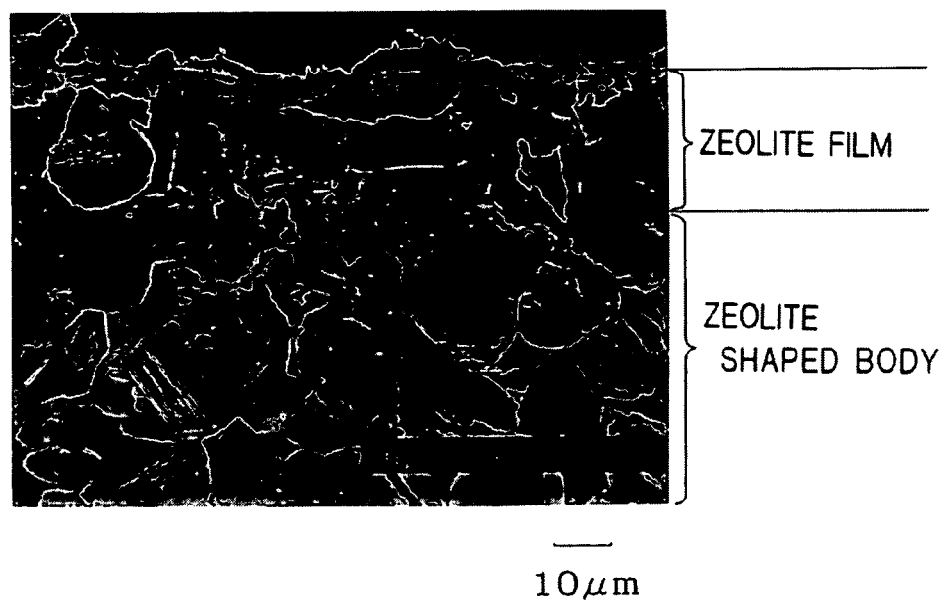
FIG. 22 is a SEM photograph showing the microstructure of the fractured surface of zeolite layered intermediate body obtained in example 21 of the second invention.

The resulting sol was added to a Teflon inner cylinder-attached pressure vessel with 100 ml capacity made of a stainless steel and the zeolite shaped body obtained in the example 19 was immersed in the sol and reacted for 18 hours in an oven at 180° C. Observation of the fractured surface by a scanning electron microscope (SEM) after the reaction made it clear, as shown in SEM photograph of FIG. 22, that an about 25 μm thick dense layer was formed on the zeolite shaped body and it was found by x-ray diffraction that the dense membrane was of a MFI type zeolite membrane.

When the zeolite layered intermediate body obtained as described above was heated to 500° C. and kept at the temperature for 4 hours in an electric furnace to remove tetrapropylammonium (TPA), no crack was observed by a Rhodamine test and no molecule was found permeating by a pervaporation method using triethylbenzene to make it clear that the product was a dense zeolite layered composite free of cracks.

EXAMPLE 22

The Second Invention (6)

A zeolite layered intermediate body was produced on a zeolite shaped body of the example 20 in the same manner as the example 21.

When the zeolite layered intermediate body zeolite layered intermediate body obtained as described above was heated to 500° C. and kept at the temperature for 4 hours in an electric furnace to remove tetrapropylammonium (TPA), no crack was observed by a Rhodamine test and no molecule was found permeating by a pervaporation method using triethylbenzene to make it clear that the product was a dense zeolite layered composite free of cracks.

Incidentally, the cracks caused in the zeolite membrane owing to thermal expansion difference is as small as about 8 to 50 angstrom and cannot be detected even by SEM. Therefore, in the invention, as the above-mentioned crack measurement method, the following method was employed.

A first method (Rhodamine test) is a method carried out by dropping Rhodamine B on a zeolite membrane and observing the result with an optical microscope.

Figure 15:
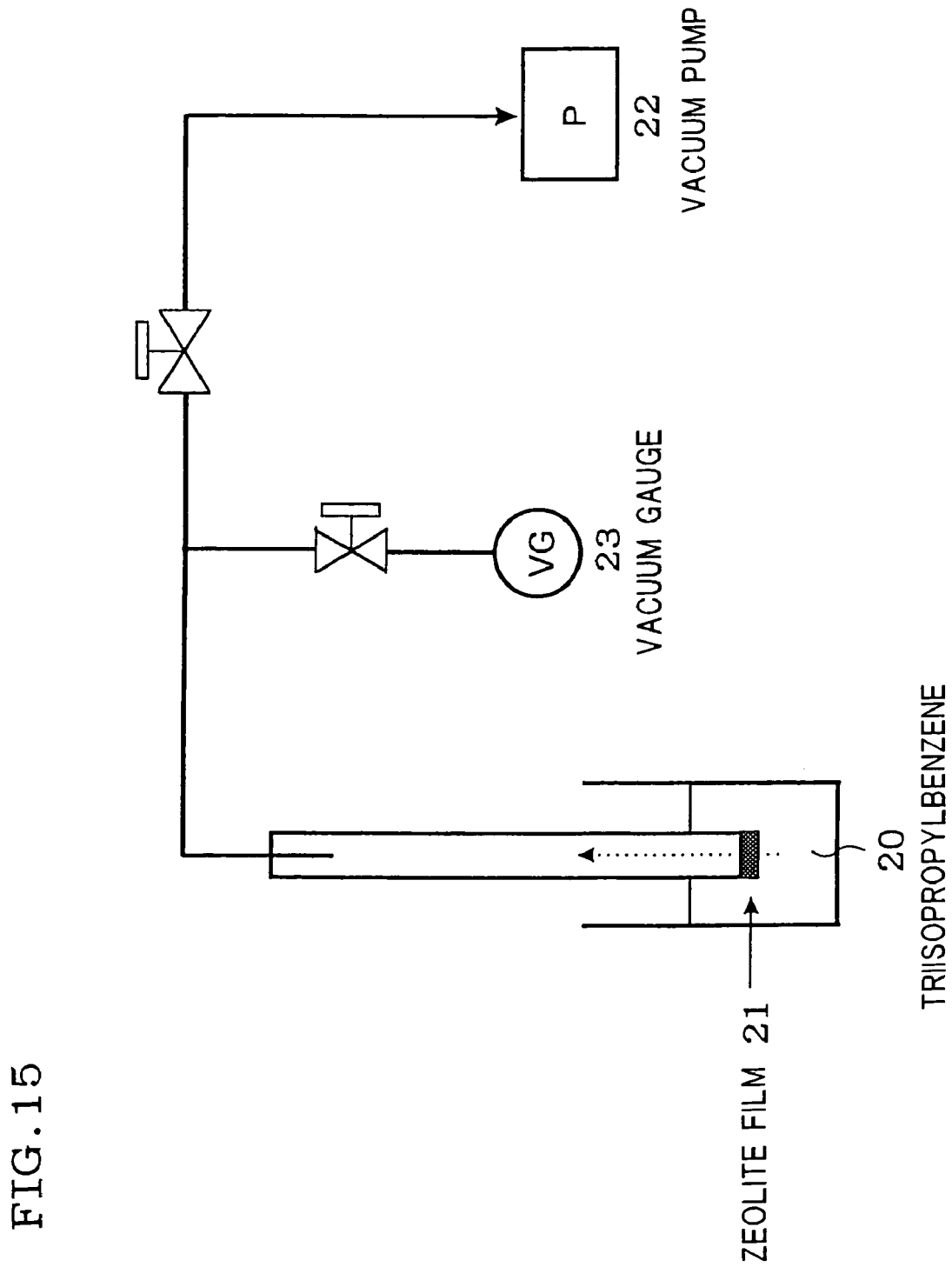
FIG. 15 is a schematic figure illustrating the crack measurement method by a pervaporation method.
Figure 16:
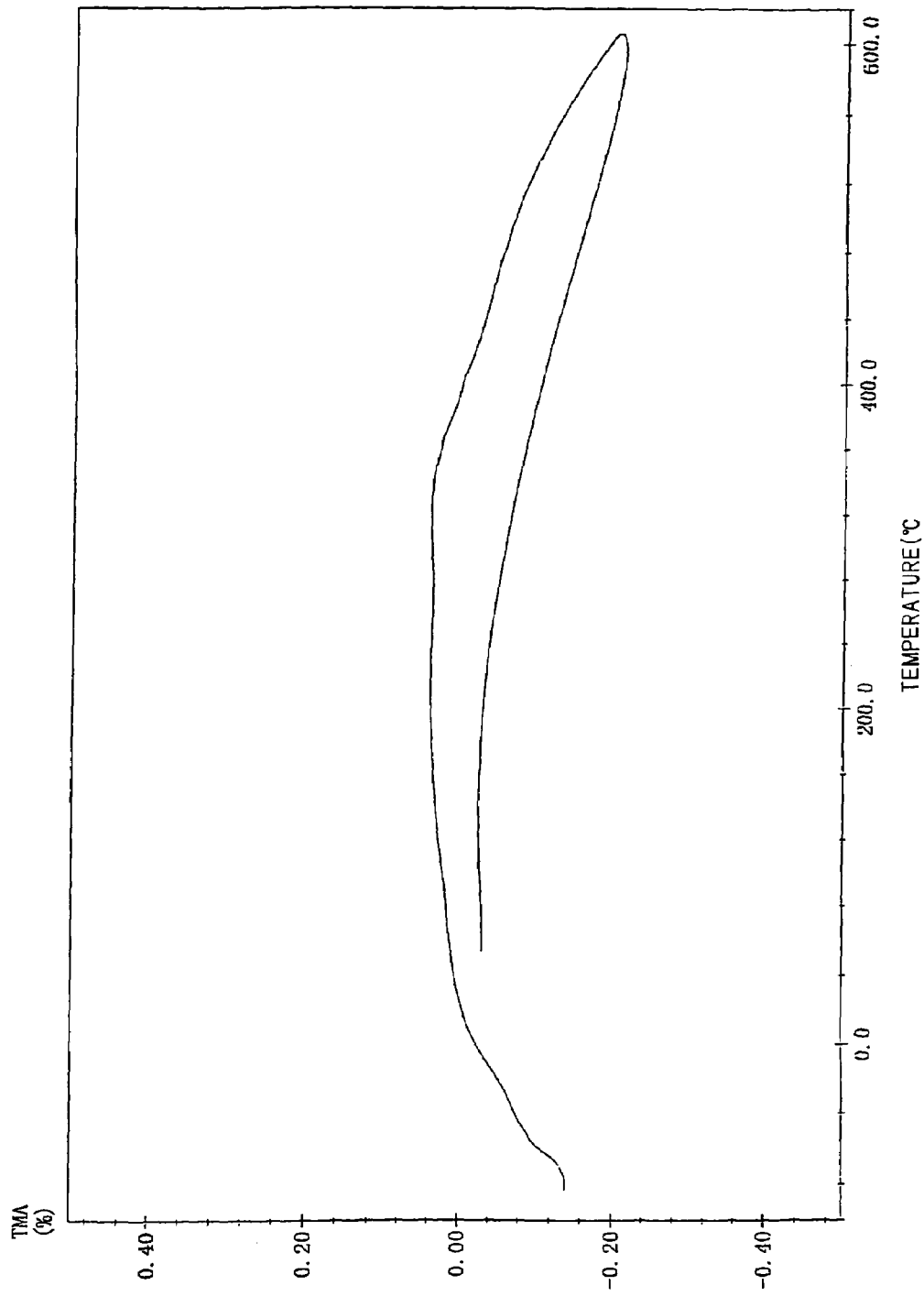
FIG. 16 is a graph showing the thermal expansion curve of a MFI type zeolite.

A second method (pervaporation method) is a method carried out, as shown in FIG. 15, by sucking triisopropylbenzene (TIPB) molecule 20 by a vacuum pump 22 and passing it through a zeolite membrane 21 to observe the existence of cracks by a vacuum gauge 23 or gas chromatography.

EXAMPLE 23

The Third Invention (1)

A Teflon beaker of 200 ml capacity was charged with about 30% by weight of silica sol (trade name: Snowtex S, produced by Corporation Nissan Chemical) and a 10% tetrapropylammonium hydroxide (TPAOH) solution (produced by Wako Pure Chemical Industries, Ltd.) while the mixing ratio (TPA/$SiO_2$) of TPA (tetrapropylammonium ion) of the TPAOH solution and $SiO_2$ being adjusted to be 0.04 by mole and the resulting solution was stirred at room temperature for 30 minutes by a magnetic stirrer and after that, further being heated at 80° C., the resulting solution was continuously stirred and kneaded manually by a Teflon rod to evaporate water and obtain a colorless dried gel. The obtained dried gel was subjected to x-ray diffraction to investigate the crystal structure to find it was amorphous.

The obtained dried gel 100 g was added to a Teflon container of 500 ml capacity and mixed with 100 g of distilled water and 1,200 g of zirconia ball of 5 mm diameter and wet pulverized for 24 hours in a ball mill stand to obtain a slurry.

Figure 23:
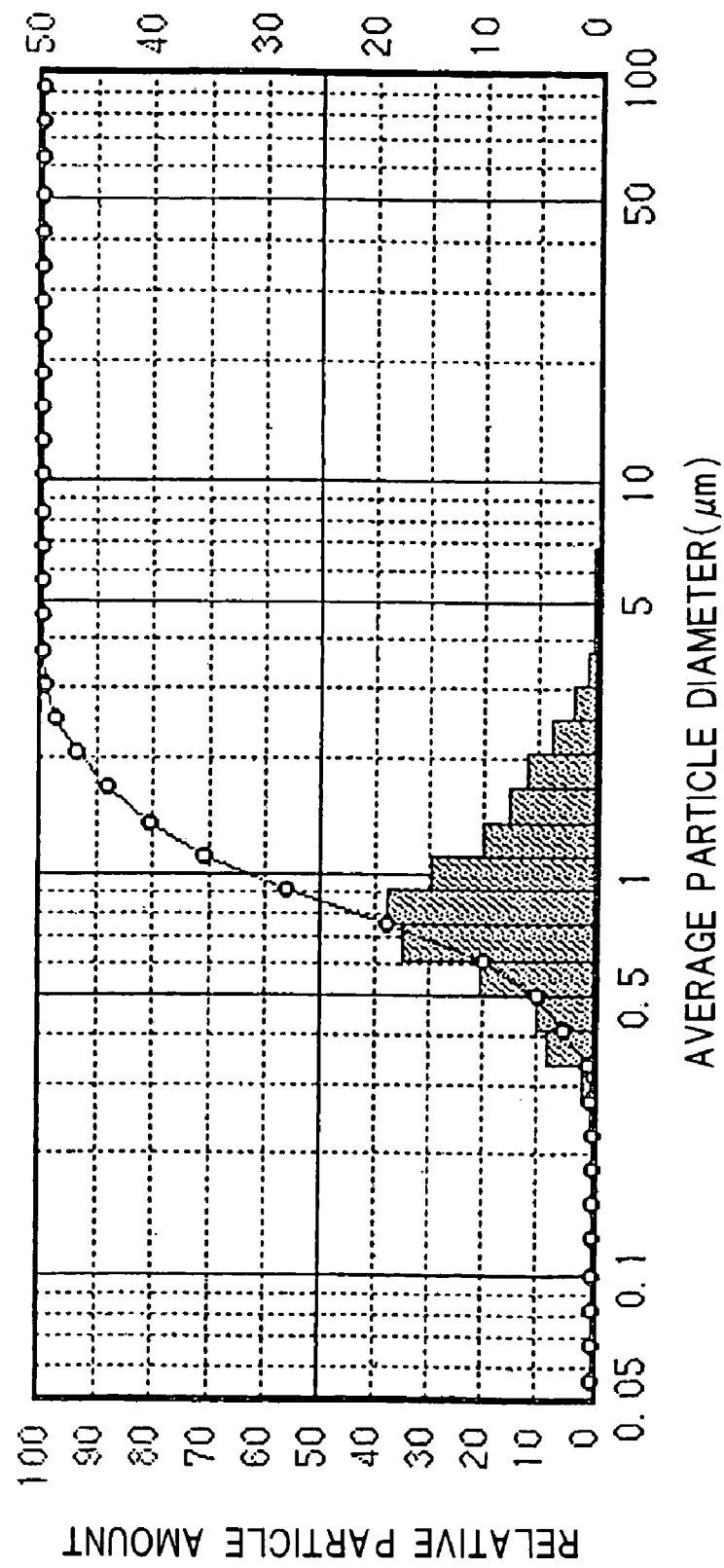
FIG. 23 is a graph showing the particle degree distribution of the slurry obtained in the example 23 of the third invention.

As shown in FIG. 23, the particle size of the slurry was investigated by a laser diffraction type particle size distribution measurement apparatus (trade name: SALD-2000A manufactured by Shimazu Corporation) to find the particle distribution; 10% volume particle diameter of 0.5 µm, 50% volume particle diameter of 0.9 µm, and 90% volume diameter of 1.8 µm.

The slurry was passed through meshes of 1,000 µm to separate and recover zirconia ball mill of 5 mm diameter and stirred by a magnetic stirrer.

The resulting slurry was dried by a spray drier apparatus (trade name: DL-41 model manufactured by Yamato Science Co., Ltd.) in conditions of 1 kgf/cm$^2$ spraying air pressure, 0.8 m$^3$/min dried air flow rate, 25 ml/min solution feeding rate, and 180° C. blowing temperature to obtain a dried gel.

Figure 24:
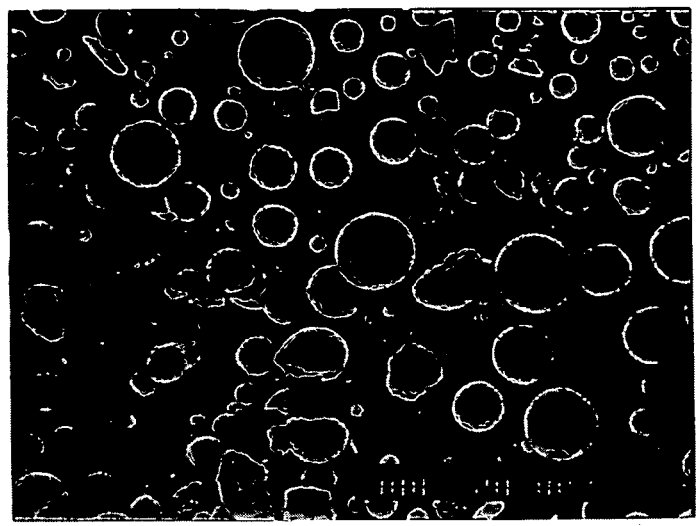
FIG. 24 is a SEM photograph showing the microstructure of the outer surface of the dried gel obtained in example 23 of the third invention.

As shown in FIG. 24, the obtained dried gel granulated powder was observed by a scanning electron microscope (SEM) to find the maximum particle diameter was 40 µm.

The dried gel granulated powder obtained as described above was pressed by a uniaxial pressing with a die (the entire pressure of 1,000 kgf) to obtain a rod-like shaped body of 5×4×40 mm and a disk-like shaped body of 18 mmϕ diameter and 1.8 mm thickness and further shaped by cold isostatic pressing (the entire pressure of 2,500 kgf/cm$^2$) to obtain shaped bodies.

The obtained each shaped body was set on a Teflon plate so as to keep each shaped body from water in a Teflon inner cylinder-attached pressure vessel made of a stainless steel 100 ml and filled with distilled water in the same weight as that of each shaped body and reaction was caused under spontaneous steam pressure for 10 hours in an oven at 180° C. The shaped body was investigated by x-ray diffraction after the reaction to be found it was MFI type zeolite. The shaped body was sufficiently dried at 80° C. to obtain a zeolite shaped body.

Figure 25:
FIG. 25 and FIG. 26 are SEM photographs showing the microstructure of the fractured surface of the zeolite shaped body obtained in example 23 of the third invention.
Figure 26:
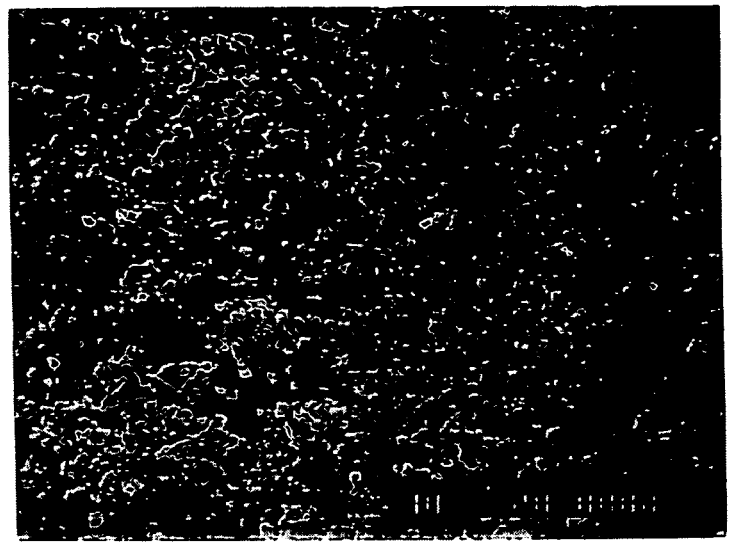

The microstructure of the zeolite shaped body obtained as described above was observed by scanning electron microscope (SEM) and the homogeneity was calculated by the photograph to find the area of the sound parts was 100% and as shown in FIG. 25 and FIG. 26, no degranulation of granules was observed and the microstructure was even without showing non-denseness and denseness in the granule. Further, the average particle diameter was found to be 0.8 µm according to the SEM photograph.

Further, the rod-like zeolite shaped body was subjected to 4-point bending strength measurement according to JIS R1601 to find it was 25 MPa. Also, the disk-like zeolite shaped body was subjected to pressure loss measurement to find it was 0.18 atmospheric pressure.

EXAMPLE 24

The Third Invention (2)

A Teflon beaker of 200 ml capacity was charged with about 30% by weight of silica sol (trade name: Snowtex S, produced by Corporation Nissan Chemical) and a 10% tetrapropylammonium hydroxide (TPAOH) solution (produced by Wako Pure Chemical Industries, Ltd.) while the mixing ratio (TPA/SiO$_2$) of TPA (tetrapropylammonium ion) of the TPAOH solution and SiO$_2$ being adjusted to be 0.04 by mole and the resulting solution was stirred at room temperature for 30 minutes by a magnetic stirrer to obtain a mixed solution of tetrapropylammonium hydroxide (TPAOH) and silica sol for a spray drier. The mixed solution was dried by a spray drier apparatus (trade name: Valvis Mini Spray GA 32 model manufactured by Yamato Scientific Co., Ltd.) in conditions of 1 kgf/cm$^2$ spraying air pressure, 0.4 m$^3$/min dried air flow rate, 3 ml/min solution feeding rate, and 180° C. blowing temperature to obtain a dried gel. The obtained dried gel was subjected to x-ray diffraction to investigate the crystal structure to find it was amorphous.

Figure 27:
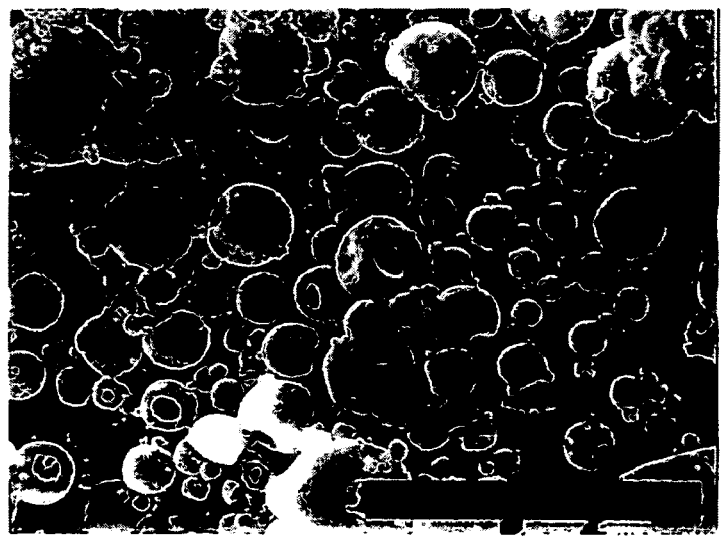
FIG. 27 is a SEM photograph showing the microstructure of the outer surface of the dried gel obtained in example 24 of the third invention.

As shown in FIG. 27, the microstructure of the obtained dried gel was observed by a scanning electron microscope (SEM) in the same manner as the example 23 to find the maximum particle diameter was 15 µm.

The dried gel was pressed by a uniaxial pressing with a die (the entire pressure of 1,000 kgf) to obtain a rod-like shaped body of 5×4×40 mm and a disk-like shaped body of 18 mmϕ diameter and 1.8 mm thickness and further shaped by cold isostatic pressing (1,000 kgf/cm$^2$) to obtain shaped bodies. The obtained each shaped body was subjected to the reaction in the same manner as the example 23 under spontaneous steam pressure for 10 hours in an oven at 180° C.

Figure 28:
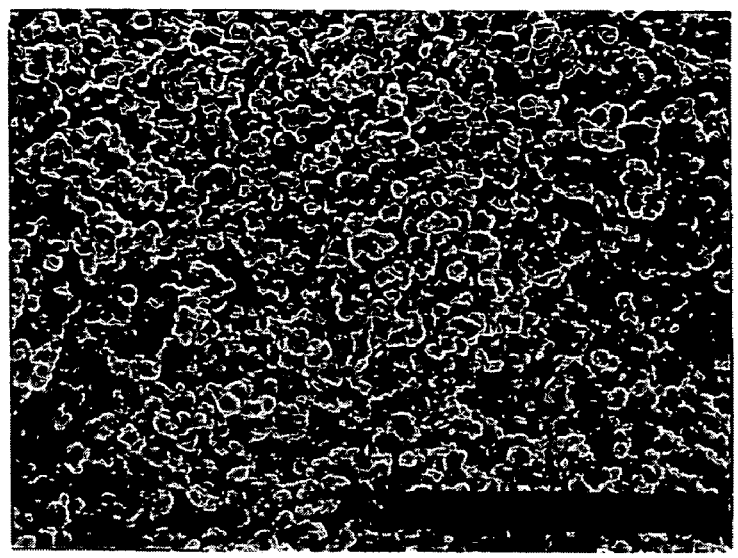
FIG. 28 and FIG. 29 are SEM photographs showing the microstructure of the fractured surface of the zeolite shaped body obtained in example 24 of the third invention.
Figure 29:
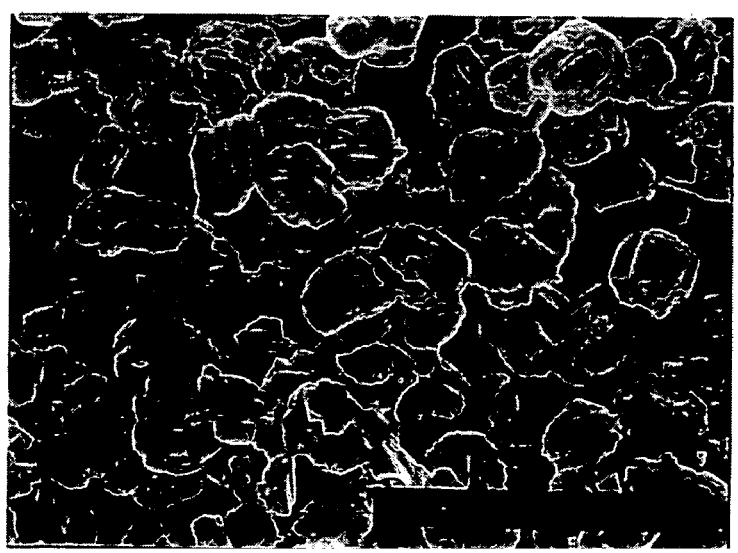

The microstructure of the zeolite shaped body was observed by scanning electron microscope (SEM) in the same manner as the example 23 to find the area of the sound parts was 100% and as shown in FIG. 28 and FIG. 29, no degranulation of granules was observed and the microstructure was even without showing non-denseness and denseness in the granule. Further, according to the SEM photograph, the average particle diameter was calculated to find it was 7.5 µm.

Further, the rod-like zeolite shaped body was subjected to 4-point bending strength measurement in the same manner as the example 23 to find it was 6 MPa. Also, the disk-like zeolite shaped body was subjected to pressure loss measurement to find it was 0.6×10$^{-3}$ atmospheric pressure.

COMPARATIVE EXAMPLE 17

The Third Invention (3)

A Teflon beaker of 200 ml capacity was charged with about 30% by weight of silica sol (trade name: Snowtex S, produced by Corporation Nissan Chemical) and a 10% tetrapropylammonium hydroxide (TPAOH) solution (produced by Wako Pure Chemical Industries, Ltd.) while the mixing ratio (TPA/SiO$_2$) of TPA (tetrapropylammonium ion) of the TPAOH solution and SiO$_2$ being adjusted to be 0.04 by mole and the resulting solution was stirred at room temperature for 30 minutes by a magnetic stirrer and after that, further being heated at 80° C., the solution was continuously stirred and kneaded manually by a Teflon rod to evaporate water and obtain a colorless dried gel. The obtained dried gel was subjected to x-ray diffraction to investigate the crystal structure to find it was amorphous.

The dried gel was pulverized in an agate crucible and passed through meshes of 355 µm to obtain an under-mesh powder.

Figure 30:
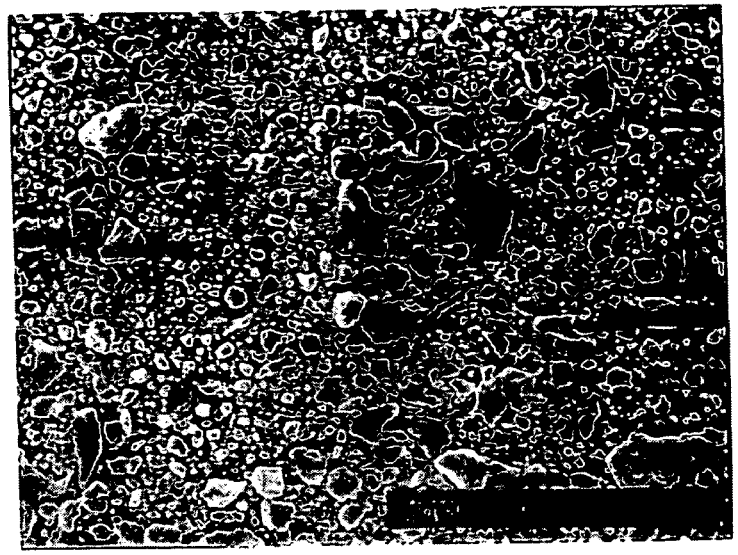
FIG. 30 is a SEM photograph showing the microstructure of the outer surface of the dried gel obtained in comparative example 17 of the third invention.

As shown in FIG. 30, the microstructure of the obtained dried gel was observed by SEM to find many angular particles of about 50 µm size exist.

The dried gel obtained in such a manner was pressed by a uniaxial pressing with a die (the entire pressure of 1,000 kgf) to obtain a rod-like shaped body of 5×4×40 mm and a disk-like shaped body of 18 mmφ diameter and 1.8 mm thickness and further shaped by cold isostatic pressing (1,000 kgf/cm$^2$) to obtain shaped bodies.

The obtained each shaped body was set on a Teflon plate so as to keep each shaped body from water in a Teflon inner cylinder-attached pressure vessel 100 ml made of a stainless steel and filled with distilled water in the same weight as that of each shaped body and reaction was caused under spontaneous steam pressure for 10 hours in an oven at 180° C. The shaped body was investigated by x-ray diffraction after the reaction to be found it was MFI type zeolite. The shaped body was sufficiently dried at 80° C. to obtain a zeolite shaped body.

Figure 31:
FIG. 31 and FIG. 32 are SEM photographs showing the microstructure of the fractured surface of the zeolite shaped body obtained in comparative example 17 of the third invention.
Figure 32:
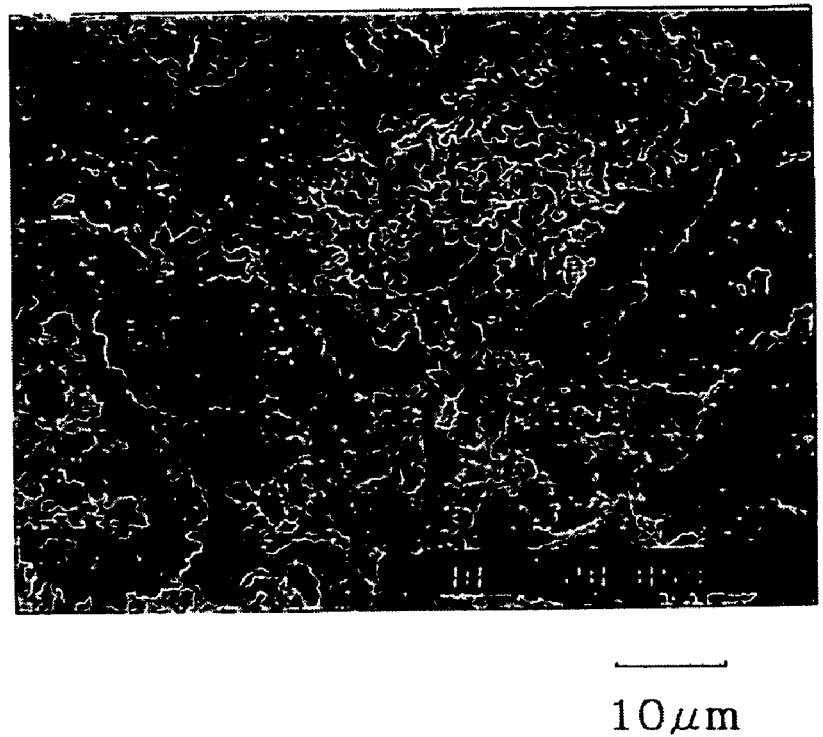

The micro structure of the zeolite shaped body obtained as described above was observed by scanning electron microscope (SEM) and the homogeneity was calculated according to the photograph to find the area of the sound parts was 62% and as shown in FIG. 31 and FIG. 32, existence of defects owing to degranulation and partially densified portions with granules were observed. Further, the average particle diameter was found to be 0.8 μm according to the SEM photograph.

Further, the rod-like zeolite shaped body was subjected to 4-point bending strength measurement according to JIS R1601 to find it was 26 MPa. Also, the disk-like zeolite shaped body was subjected to pressure loss measurement to find it was 1.8 atmospheric pressure.

Table 5 collectively shows the measurement results of the homogeneity [the area of the sound parts (%)] of the microstructure and the average particle diameter (μm) of the zeolite shaped bodies obtained in the examples 23, 24 and the comparative example 17 and the 4-point bending strength (MPa) and the pressure loss (atm) of the zeolite shaped bodies obtained in the examples 23, 24 and the comparative example 17.

According to Table 5, as compared with the zeolite shaped body obtained in the comparative example 17, the zeolite shaped bodies obtained in the comparative examples 23, 24 were found to have significantly wide area of sound parts (no defect). Further, the average particle diameter and the 4-point bending strength were found practically sufficiently high and moreover their pressure loss was found extremely low. Consequently, if a zeolite layered composite comprising a shaped body (a substrate) with such an extremely low pressure loss just like the zeolite shaped bodies obtained in the examples 23, 24 and a zeolite membrane free of defects such as cracks and layered or formed thereon is used as a gas separation membrane of a molecular sieve and a pervaporation membrane, the composite can be a highly functional and useful material with a high flux.

TABLE 5

| | Homogeneity of microstructure [the area of the sound parts (%)] | Average particle diameter (μm) | 4-point bending strength (MPa) | Pressure loss ΔP(atm) |
|---|---|---|---|---|
| Example 23 | 100 | 0.8 | 25 | 0.18 |
| Example 24 | 100 | 7.5 | 6 | 0.0006 |
| Comparative example 17 | 62 | 0.8 | 26 | 1.80 |

EXAMPLE 25

The Third Invention (4)

A sol for membrane formation of a zeolite membrane was produced by mixing 15.26 g of a 10 % tetrapropylammonium hydroxide (TPAOH) solution (produced by Wako Pure Chemical Industries, Ltd.) and 2.00 g of tetrapropylammonium bromide (TPABr) (produced by Wako Pure Chemical Industries, Ltd.), further adding 49.85 g of distilled water and 6.00 g of about 30% by weight of silica sol (trade name: Snowtex S, produced by Corporation Nissan Chemical) in such a manner that the mole ratio of $SiO_2$/TPAOH/TPABr/water becomes 1/0.25/0.25/125, and stirring the resulting mixture at room temperature for 30 minutes by a magnetic stirrer.

Figure 35:
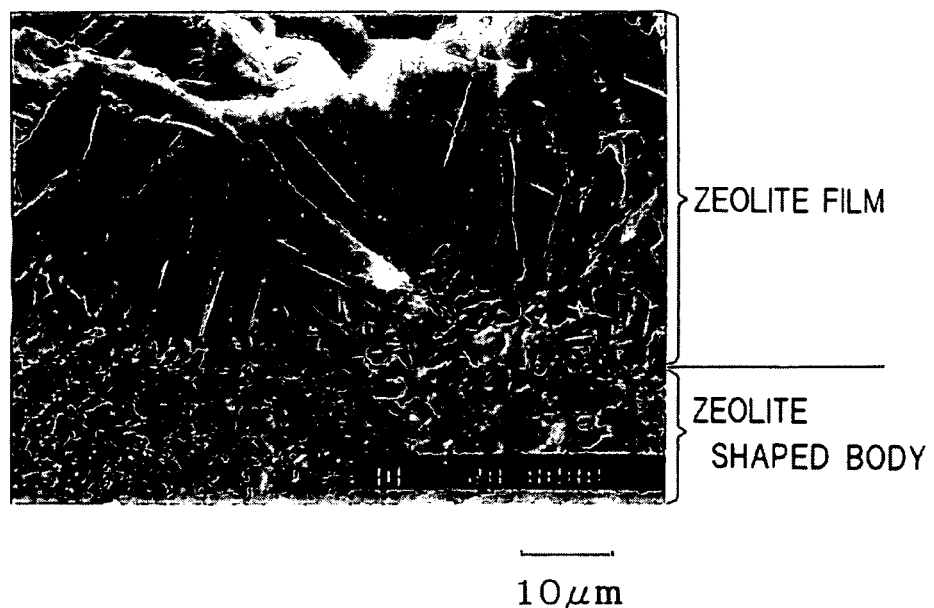
FIG. 35 is a SEM photograph showing the microstructure of the fractured surface of the zeolite layered intermediate body obtained in example 25 of the third invention.

The resulting sol was added to a Teflon inner cylinder-attached pressure vessel with 100 ml capacity made of a stainless steel and the zeolite shaped body obtained in the example 23 was immersed in the sol and reacted for 18 hours in an oven at 180° C. Observation of the fractured surface by a scanning electron microscope (SEM) after the reaction made it clear, as shown in SEM photograph of FIG. 35, that an about 25 μm thick dense layer was formed on the zeolite shaped body and it was found by x-ray diffraction that the dense membrane was of a MFI type zeolite membrane.

When the zeolite layered intermediate body obtained as described above was heated to 500° C. and kept at the temperature for 4 hours in an electric furnace to remove tetrapropylammonium (TPA), no crack was observed by a Rhodamine test and no molecule was found permeating by a pervaporation method using triethylbenzene to make it clear that the product was a dense zeolite layered composite free of cracks.

EXAMPLE 26

The Third Invention (5)

A zeolite layered intermediate body was obtained in the same manner as the example 25 on the zeolite shaped body obtained in the example 24.

When the zeolite layered intermediate body obtained as described above was heated to 500° C. and kept at the temperature for 4 hours in an electric furnace to remove tetrapropylammonium (TPA), no crack was observed by a Rhodamine test and no molecule was found permeating by a pervaporation method using triethylbenzene to make it clear that the product was a dense zeolite layered composite free of cracks.

INDUSTRIAL APPLICABILITY

As described above, the invention can provide a zeolite shaped body on which a zeolite membrane can be formed without causing cracking, and satisfactorily reducing pressure loss and maintaining and improving mechanical strength when it is used as a gas separation membrane of a molecular sieve membrane and a pervaporation membrane and the like; a zeolite layered intermediate body comprising the zeolite shaped body and a zeolite membrane containing a template and layered thereon; a zeolite layered composite produced by calcining the zeolite layered intermediate body, and their efficient production methods. Consequently, the invention can efficiently be applicable especially to the fields where separation membranes with high fraction capabilities and high catalyst carrying functions are required and fields (e.g., petrochemical, water treatment, pharmaceutical, and food industrial fields) where high chemical resistance is required.

The invention claimed is:

1. A method for producing a zeolite layered composite, comprising layering a template-containing zeolite membrane having substantially the same composition as that of a zeolite shaped body of a completely crystallized zeolite composed of tetrapropylammonium ion (TPA) and silica sol in a mixing ratio ($TPA/SiO_2$) of 0.015 to 0.08 by mole and containing a template therein on said zeolite shaped body, and simultaneously removing the template from said zeolite membrane and said zeolite shaped body by calcining the resulting layered product to obtain a zeolite layered composite comprising said zeolite shaped body and said zeolite membrane layered thereon.

2. A method for producing a zeolite layered composite, comprising layering a template-containing zeolite membrane having substantially the same composition as that of a zeolite shaped body of an incompletely crystallized zeolite and composed of tetrapropylammonium ion (TPA) and silica sol in a mixing ratio ($TPA/SiO_2$) of 0.02 to 0.12 by mole and containing a template therein on said zeolite shaped body, and simultaneously removing a template from said zeolite membrane and said zeolite shaped body by calcining the resulting layered product to obtain a zeolite layered composite comprising said zeolite shaped body and said zeolite membrane layered thereon.

3. A method for producing a zeolite layered intermediate body, comprising preparing a solution by adding a tetrapropylammonium hydroxide (TPAOH) solution to silica sol so that a mixing ratio ($TPA/SiO_2$) of tetrapropylammonium ion (TPA) to said silica sol is 0.015 to 0.08 by mol, drying said prepared solution by kneading, wet pulverizing said dried solution to obtain a slurry, spray drying said slurry to obtain a dried granular substance, shaping said dried granular substance to form a shaped product, subjecting said shaped product to crystallization treatment to obtain a zeolite shaped body, immersing said zeolite shaped body in a solution having substantially the same composition as said prepared solution, and forming a template-containing zeolite membrane on said zeolite shaped body by hydrothermally synthesizing said template-containing zeolite membrane thereon to produce a layered body comprising said zeolite shaped body and said template-containing zeolite membrane.

4. The method according to claim 3, wherein said prepared solution consists of said tetrapropylammonium hydroxide (TPAOH) solution added to said silica sol to provide said ($TPA/SiO_2$) mixing ratio.

5. A method for producing a zeolite layered intermediate body, comprising preparing a solution adding a tetrapropylammonium hydroxide (TPAOH) solution to silica sol so that a mixing ratio ($TPA/SiO_2$) of tetrapropylammonium ion (TPA) to said silica sol is 0.015 to 0.08 by mole, spray drying said prepared solution, shaping said spray dried solution to form a shaped product, subjecting said shaped product to crystallization treatment to obtain a zeolite shaped body, immersing said zeolite shaped body in a solution with substantially the same composition as that of said prepared solution, and forming a template-containing zeolite membrane on said zeolite shaped body by hydrothermally synthesizing said template-containing zeolite membrane thereon to produce a layered body comprising said zeolite shaped body and said template-containing zeolite membrane.

6. The method according to claim 5, wherein said prepared solution consists of said tetrapropylammonium hydroxide (TPAOH) solution added to said silica sol to provide said ($TPA/SiO_2$) mixing ratio.

7. A method for producing a zeolite layered composite, comprising preparing a solution by adding a tetrapropylammonium hydroxide (TPAOH) solution to silica sol in so that a mixing ratio ($TPA/SiO_2$) of tetrapropylammonium ion (TPA) to said silica sol is 0.015 to 0.08 by mol, drying said prepared solution by kneading, wet pulverizing said dried solution to form a slurry, spray drying said slurry to obtain a dried granular product, shaping said dried granular substance to form a shaped product, subjecting said shaped product to crystallization treatment to obtain a zeolite shaped body, immersing said zeolite shaped body in a solution with substantially the same composition as to that of said prepared solution, and forming a template-containing zeolite membrane on the zeolite shaped body by hydrothermally synthesizing said template-containing zeolite membrane thereon to produce a layered body comprising said zeolite shaped body and said template-containing zeolite membrane, and then removing a template by calcining said layered body.

8. The method according to claim 7, wherein said prepared solution consists of said tetrapropylammonium hydroxide (TPAOH) solution added to said silica sol to provide said ($TPA/SiO_2$) mixing ratio.

9. A method for producing a zeolite layered composite, comprising preparing a solution by adding a tetrapropylammonium hydroxide (TPAOH) solution to silica sol so that a mixing ratio ($TPA/SiO_2$) of tetrapropylammonium ion (TPA) to said silica sol is 0.015 to 0.08 by mol, spray drying said prepared solution, shaping said spray dried solution to form a shaped product, subjecting said shaped product to crystallization treatment to obtain a zeolite shaped body, immersing said zeolite shaped body in a solution with substantially the same composition as that of said prepared solution, forming a template-containing zeolite membrane on said zeolite shaped body by hydrothermally synthesizing said template-containing zeolite membrane thereon to produce a layered body comprising said zeolite shaped body and said template-containing zeolite membrane, and then removing a template by calcining said layered body.

10. The method according to claim 9, wherein said prepared solution consists of said tetrapropylammonium hydroxide (TPAOH) solution added to said silica sol to provide said ($TPA/SiO_2$) mixing ratio.

* * * * *